US007031839B2

(12) United States Patent
Tabarovsky et al.

(10) Patent No.: US 7,031,839 B2
(45) Date of Patent: Apr. 18, 2006

(54) MULTI-FREQUENCY FOCUSING FOR MWD RESISTIVITY TOOLS

(75) Inventors: Leonty A. Tabarovsky, Cypress, TX (US); Alexandre N. Bespalov, Spring, TX (US); Stanislav W. Forgang, Houston, TX (US); Michael B. Rabinovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/934,596

(22) Filed: Sep. 3, 2004

(65) Prior Publication Data

US 2005/0030059 A1 Feb. 10, 2005

Related U.S. Application Data

(63) Continuation-in-part of application No. 10/295,969, filed on Nov. 15, 2002, now Pat. No. 6,906,521.

(51) Int. Cl.

| | |
|---|---|
| ***G01V 1/40*** | (2006.01) |
| ***G01V 3/18*** | (2006.01) |
| ***G01V 5/04*** | (2006.01) |
| ***G01V 9/00*** | (2006.01) |
| ***G06F 19/00*** | (2006.01) |

(52) U.S. Cl. ............................. 702/7; 702/6; 324/328; 324/329; 324/330; 324/331; 324/332; 324/333; 324/334; 324/335; 324/336; 324/337; 324/338; 324/339; 324/340; 324/341; 324/342; 324/343; 324/344; 324/345; 324/346

(58) Field of Classification Search ..................... None
See application file for complete search history.

(56) References Cited

U.S. PATENT DOCUMENTS 6,636,045 B1 * 10/2003 Tabarovsky et al. ........ 324/343

* cited by examiner

*Primary Examiner*—John Barlow
*Assistant Examiner*—Sujoy Kundu
(74) *Attorney, Agent, or Firm*—Madan, Mossman & Sriram, P.C.

(57) ABSTRACT

An induction logging tool is used on a MWD bottom hole assembly. Due to the finite, nonzero, conductivity of the mandrel, conventional multi frequency focusing (MFF) does not work. A correction is made to the induction logging data to give measurements simulating a perfectly conducting mandrel. MFF can then be applied to the corrected data to give formation resistivities.

43 Claims, 13 Drawing Sheets

MULTI-FREQUENCY FOCUSING FOR MWD RESISTIVITY TOOLS

CROSS REFERENCES TO RELATED APPLICATIONS

This application is a continuation-in-part of U.S. patent application Ser. No. 10/295,969 filed on Nov. 15, 2002 now U.S. Pat. No. 6,906,521.

BACKGROUND OF THE INVENTION

1. Field of the Invention

The invention is related to the field of electromagnetic induction well logging for determining the resistivity of earth formations penetrated by wellbores. More specifically, the invention addresses the problem of selecting frequencies of operation of a multifrequency induction logging tool.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard et al '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

As is well known in the art, the magnitude of the signals induced in the receiver coils is related not only to the conductivity of the surrounding media (earth formations) but also to the frequency of the alternating current. An advantageous feature of the instrument described in Beard '761 is that the alternating current flowing through the transmitter coil includes a plurality of different component frequencies. Having a plurality of different component frequencies in the alternating current makes possible more accurate determination of the apparent conductivity of the medium surrounding the instrument.

One method for estimating the magnitude of signals that would be obtained at zero frequency is described, for example, in U.S. Pat. No. 5,666,057, issued to Beard et al., entitled, "Method for Skin Effect Correction and Data Quality Verification for a Multi-Frequency Induction Well Logging Instrument". The method of Beard '057 in particular, and other methods for skin effect correction in general, are designed only to determine skin effect corrected signal magnitudes, where the induction logging instrument is fixed at a single position within the earth formations. A resulting drawback to the known methods for skin effect correction of induction logs is that they do not fully account for the skin effect on the induction receiver response within earth formations including layers having high contrast in the electrical conductivity from one layer to the next. If the skin effect is not accurately determined, then the induction receiver responses cannot be properly adjusted for skin effect, and as a result, the conductivity (resistivity) of the earth formations will not be precisely determined.

U.S. Pat. No. 5,884,227, issued to Rabinovich et al., having the same assignee as the present invention, is a method of adjusting induction receiver signals for skin effect in an induction logging instrument including a plurality of spaced apart receivers and a transmitter generating alternating magnetic fields at a plurality of frequencies. The method includes the steps of extrapolating measured magnitudes of the receiver signals at the plurality of frequencies, detected in response to alternating magnetic fields induced in media surrounding the instrument, to zero frequency. A model of conductivity distribution of the media surrounding the instrument is generated by inversion processing the extrapolated magnitudes. Rabinovich '227 works equally well under the assumption that the induction tool device has perfect conductivity or zero conductivity. In a measurement-while-drilling device, this assumption does not hold.

Multi-frequency focusing (MFF) is an efficient way of increasing depth of investigation for electromagnetic logging tools. It is being successfully used in wireline applications, for example, in processing and interpretation of induction data. MFF is based on specific assumptions regarding behavior of electromagnetic field in frequency domain. For MWD tools mounted on metal mandrels, those assumptions are not valid. Particularly, the composition of a mathematical series describing EM field at low frequencies changes when a very conductive body is placed in the vicinity of sensors. Only if the mandrel material were perfectly conducting, would MFF be applicable. There is a need for a method of processing multi-frequency data acquired with real MWD tools having finite non-zero conductivity. The present invention satisfies this need.

SUMMARY OF THE INVENTION

The present invention is a method and apparatus for determining a resistivity of an earth formation. Induction measurements are made downhole at a plurality of frequencies using a tool. A multifrequency focusing (MFF) is applied to the data to give an estimate of the formation resistivity. The frequencies at which the measurements are made are selected based on one or more criteria, such as reducing an error amplification resulting from the MFF, increasing an MFF signal voltage, or increasing an MFF focusing factor. In one embodiment of the invention, the tool has a portion with finite non-zero conductivity.

The method and apparatus may be used in reservoir navigation. For such an application, the frequency selection may be based on a desired distance between a bottomhole assembly carrying the resistivity measuring instrument and an interface in the earth formation.

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
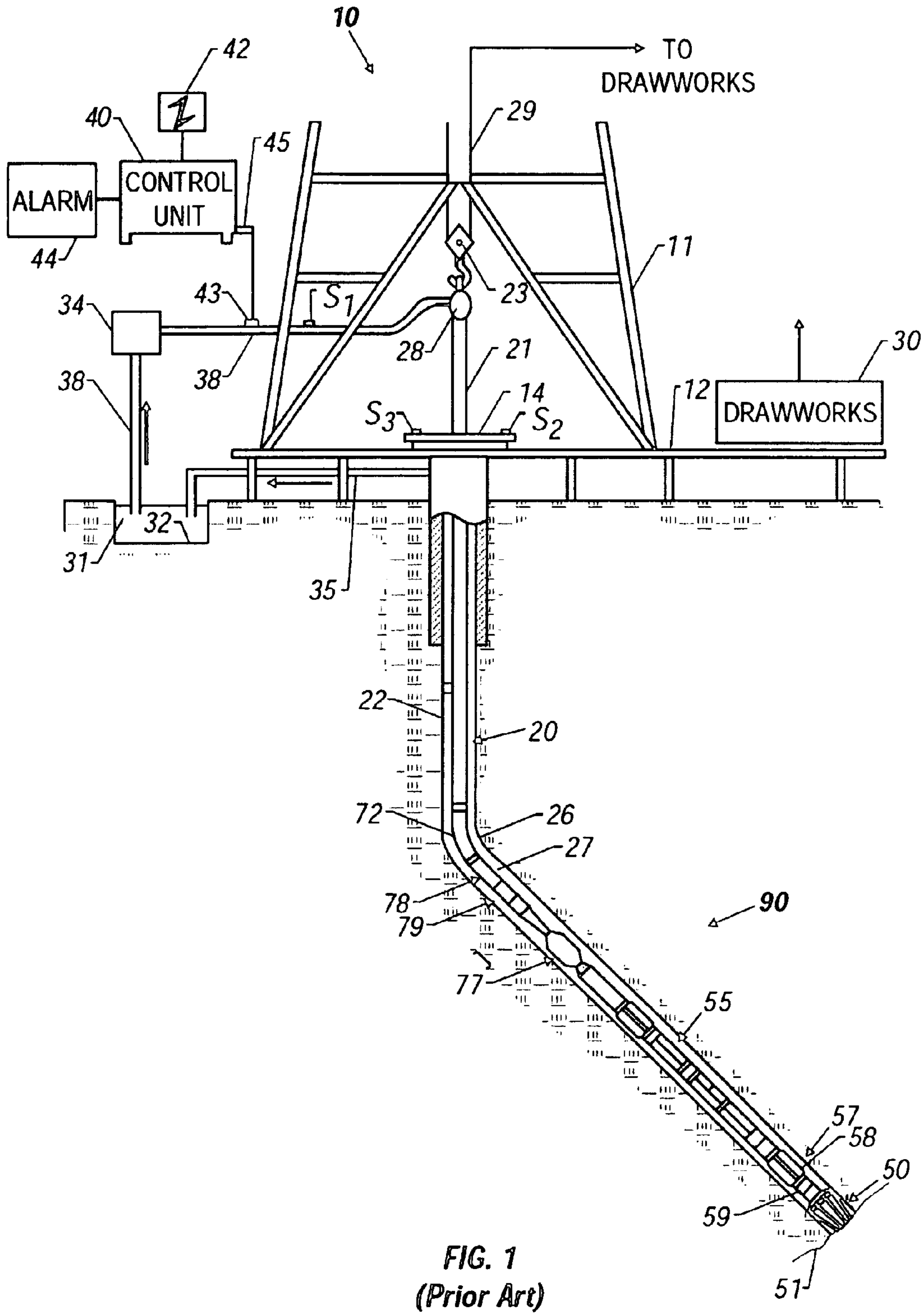
FIG. 1 (Prior Art) shows an induction logging instrument as it is typically used to make measurements for use with the method of the invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 1A:
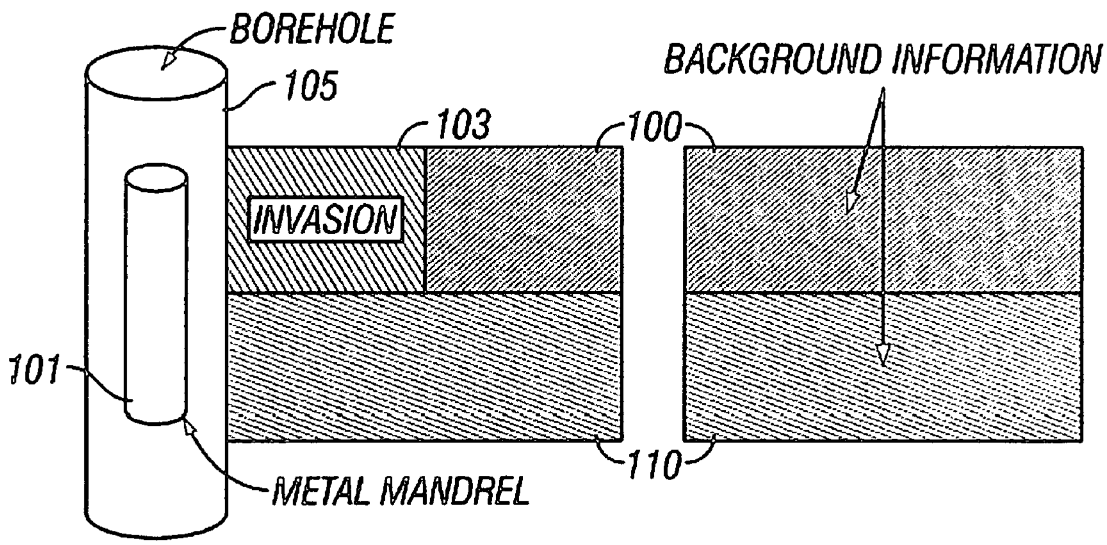
FIG. 1A (prior art) shows an induction tools conveyed within a formation layer.

FIG. 1A shows a typical configuration of a metal mandrel 101 within a borehole 105. Two formation layers, an upper formation layer 100 and a lower formation layer 110, are shown adjacent to the borehole 105. A prominent invasion zone 103 is shown in the upper formation layer.

Figure 2:
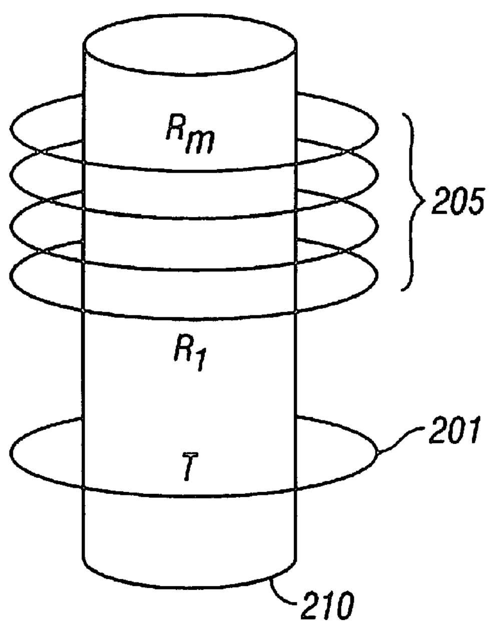
FIG. 2 (prior art) shows a typical induction tool of the present invention.

FIG. 2 shows a generic tool for evaluation of MFF in MWD applications (MFFM) using the present invention. A transmitter, T, 201 is excited at a plurality of RF frequencies $f_1, \ldots, f_n$. For illustrative purposes, eight frequencies are considered: 100, 140, 200, 280, 400, 560, 800, and 1600 kHz. A plurality of axially-separated receivers, $R_1, \ldots, R_m$, 205 are positioned at distances, $L_1, \ldots, L_m$, from transmitter. For illustrative purposes, distances of the seven receivers are chosen as L=0.3, 0.5, 0.7, 0.9, 1.1, 1.3, and 1.5 m. Transmitter 201 and receivers 205 enclose a metal mandrel 210. In all examples, the mandrel radius is 8 cm, the transmitter radius is 9 cm, and the radius of the plurality of receivers is 9 cm. Data is obtained by measuring the responses of the plurality of receivers 205 to an induced current in the transmitter 201. Such measured responses can be, for example, a magnetic field response. The mandrel conductivity may be assumed perfect (perfectly conducting mandrel, PCM) or finite (finite conductivity mandrel, FCM). In the method of the present invention, obtained data is corrected for the effects of the finite conductivity mandrel, such as skin effect, for example, in order to obtain data representative of an induction tool operated in the same manner, having an infinite conductivity. Corrected data can then be processed using multi-frequency focusing. Typical results of multi-frequency focusing can be, for instance, apparent conductivity. A calculated relationship can obtain value of conductivity, for example, when frequency is equal to zero. Any physical quantity oscillating in phase with the transmitter current is called real and any measurement shifted 90 degrees with respect to the transmitter current is called imaginary, or quadrature.

Obtaining data using a nonconducting mandrel is discussed in Rabinovich et al., U.S. Pat. No. 5,884,227, having the same assignee as the present invention, the contents of which are fully incorporated herein by reference. When using a nonconducting induction measurement device, multi-frequency focusing (MFF) can be described using a Taylor series expansion of EM field frequency. A detailed consideration for MFFW (wireline MFF applications) can be used. Transmitter 201, having a distributed current J(x,y,z) excites an EM field with an electric component E(x,y,z) and a magnetic component H(x,y,z). Induced current is measured by a collection of coils, such as coils 205.

An infinite conductive space has conductivity distribution $\sigma(x,y,z)$, and an auxiliary conductive space ('background conductivity') has conductivity $\sigma_0(x,y,z)$. Auxiliary electric dipoles located in the auxiliary space can be introduced. For the field components of these dipoles, the notation $e^n(P_0,P)$, $h^n(P_0,P)$, where n stands for the dipole orientation, P and $P_0$, indicate the dipole location and the field measuring point, respectively. The electric field E(x,y,z) satisfies the following integral equation (see L. Tabarovsky, M. Rabinovich, 1998, Real time 2-D inversion of induction logging data. Journal of Applied Geophysics, 38, 251–275.):

$$E(P_0) = E^0(P_0) + \int_{-\infty}^{+\infty}\int_{-\infty}^{+\infty}\int_{-\infty}^{+\infty}(\sigma - \sigma_0)\hat{e}(P_0 \mid P)E(P)dx\,dy\,dz. \tag{1}$$

where $E^0(P_0)$ is the field of the primary source J in the background medium $\sigma_0$. The 3×3 matrix $e(P_0|P)$ represents the electric field components of three auxiliary dipoles located in the integration point P.

The electric field, E, maybe expanded in the following Taylor series with respect to the frequency:.

$$E = \sum_{k=2}^{k=\infty} u_{k/2}(-i\omega)^{k/2} \qquad u_{3/2} = 0 \tag{2}$$

The coefficient $u_{5/2}$ corresponding to the term $\omega^{5/2}$ is independent of the properties of a near borehole zone, thus $u_{5/2}=u_{5/2}^0$. This term is sensitive only to the conductivity distribution in the undisturbed formation (100) shown in FIG. 1A.

The magnetic field can be expanded in a Taylor series similar to Equation (2):

$$H = \sum_{k=0}^{k=\infty} s_{k/2}(-i\omega)^{k/2} \qquad s_{1/2} = 0 \tag{3}$$

In the term containing $\omega^{3/2}$, the coefficient $s_{3/2}$ depends only on the properties of the background formation, in other words $s_{3/2}=s_{3/2}^0$. This fact is used in multi-frequency processing. The purpose of the multi-frequency processing is to derive the coefficient $u_{5/2}$ if the electric field is measured, and coefficient $s_{3/2}$ if the magnetic field is measured. Both coefficients reflect properties of the deep formation areas.

If an induction tool consisting of dipole transmitters and dipole receivers generates the magnetic field at m angular frequencies, $\omega_1, \omega_2, \ldots, \omega_m$, the frequency Taylor series for the imaginary part of magnetic field has the following form:

$$\mathrm{Im}(H) = \sum_{k=1}^{k=\infty} s_{k/2}\,\omega^{k/2} \qquad s_{2j} = 0; \quad j = 1, 2, \ldots, . \tag{4}$$

where $S_{k/2}$ are coefficients depending on the conductivity distribution and the tool's geometric configuration, not on the frequency. Rewriting the Taylor series for each measured frequency obtains:

$$\begin{pmatrix} H(\omega_1) \\ H(\omega_2) \\ \vdots \\ H(\omega_{m-1}) \\ H(\omega_m) \end{pmatrix} = \begin{pmatrix} \omega & \omega_1^{3/2} & \omega_1^{5/2} & \ldots & \ldots & \ldots & \omega_1^{n/2} \\ \omega & \omega_2^{3/2} & \omega_2^{5/2} & \ldots & \ldots & \ldots & \omega_2^{n/2} \\ \circ & \circ & \circ & \circ & \circ & \circ & \circ \\ \circ & \circ & \circ & \circ & \circ & \circ & \circ \\ \circ & \circ & \circ & \circ & \circ & \circ & \circ \\ \omega & \omega_{m-1}^{3/2} & \omega_{m-1}^{5/2} & \ldots & \ldots & \ldots & \omega_{m-1}^{n/2} \\ \omega & \omega_m^{3/2} & \omega_m^{5/2} & \ldots & \ldots & \ldots & \omega_m^{n/2} \end{pmatrix} \begin{pmatrix} S_1 \\ S_{3/2} \\ S_{5/2} \\ \vdots \\ S_{n/2} \end{pmatrix}. \tag{5}$$

Figure 3:
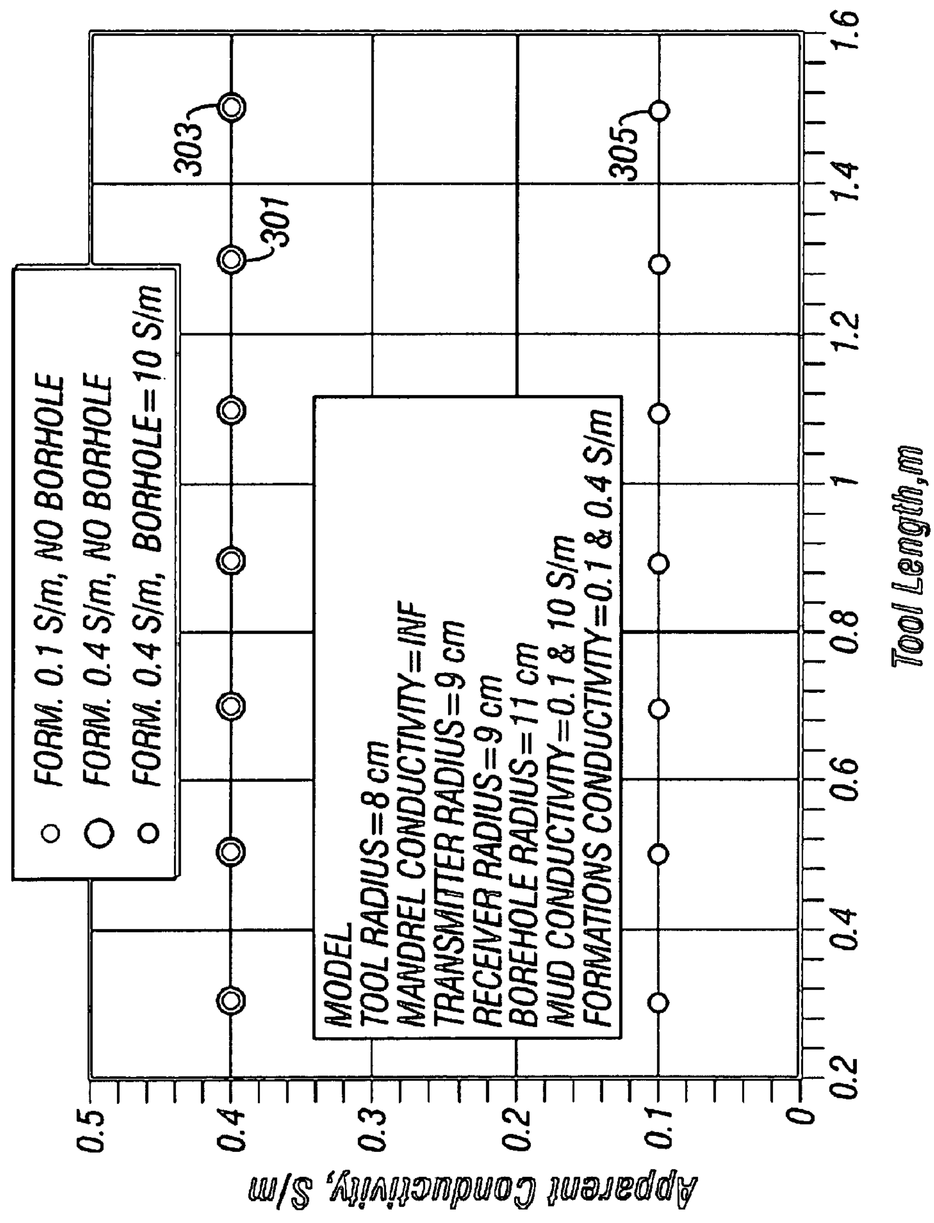
FIG. 3 (prior art) shows responses of a induction tool with a perfectly conducting mandrel.

Solving the system of Equations (5), it is possible to obtain the coefficient $s_{3/2}$. It turns out that the expansion is the same for a perfectly conducting mandrel and a non-conducting mandrel FIG. 3 shows the results of MFF for a perfectly conducting mandrel. In FIG. 3, borehole radius is 11 cm. MFF, as performed based on Eq. (5) and Eq. (3) (MFFW) produces the expected results. Data sets 301 and 305 are shown for a formation having 0.4 S/m and 0.1 S/m respectively, with no borehole effects. Data set 303 is shown for a formation having 0.4 S/m and a borehole having mud conductivity 10 S/m and 0.1 S/m. Apparent conductivity data, processed using MFFW, do not depend on borehole parameters or tool length. Specifically, apparent conductivity equals to the true formation conductivity. The present invention can be used to correct from an FCM tool to a PCM with the same sensor arrangements.

Fundamental assumptions enabling implementing MFFW are based on the structure of the Taylor series, Eq. (2) and Eq. (3). These assumptions are not valid if a highly conductive body is present in the vicinity of sensors (e.g., mandrel of MWD tools). The present invention uses an asymptotic theory that enables building MFF for MWD applications (MFFM).

The measurements from a finite conductivity mandrel can be corrected to a mandrel having perfect conductivity. Deriving a special type of integral equations for MWD tools enables this correction. The magnetic field measured in a typical MWD electromagnetic tool may be described by $$H_\alpha(P) = H_\alpha^0(P) + \beta\int_S\left\{\vec{H}^{M\alpha}\vec{h}\right\}dS \tag{6}$$

where $H_\alpha(P)$ is the magnetic field measure along the direction $\alpha$($\alpha$-component), P is the point of measurement, $H_\alpha^0(P)$ is the $\alpha$-component of the measured magnetic field given a perfectly conducting mandrel, S is the surface of the tool mandrel, $\beta=1/\sqrt{-i\omega\mu\sigma_c}$, where $\omega$ and $\mu$ are frequency and magnetic permeability, and ${}^{m\alpha}h$ is the magnetic field of an auxiliary magnetic dipole in a formation where the mandrel of a finite conductivity is replaced by an identical body with a perfect conductivity. The dipole is oriented along $\alpha$-direction. At high conductivity, $\beta$ is small.

Equation (6) is evaluated using a perturbation method, leading to the following results:

$$H_\alpha = \sum_{i=0}^{i=\infty} {}^{(i)}H_\alpha \tag{7}$$

$${}^{(0)}H_\alpha = H_\alpha^0 \tag{8}$$

$${}^{(i)}H_\alpha = \beta\int_S\left\{{}^{(i-1)}\vec{H}^{M\alpha}\vec{h}\right\}dS \tag{9}$$

$$i = 1, \ldots, \infty$$

In a first order approximation that is proportional to the parameter $\beta$:

$${}^{(1)}H_\alpha = \beta\int_S\left\{{}^{(0)}\vec{H}^{M\alpha}\vec{h}\right\}dS = \beta\int_S\left\{\vec{H}_0{}^{M\alpha}\vec{h}\right\}dS \tag{10}$$

The integrand in Eq. (10) is independent of mandrel conductivity. Therefore, the integral on the right-hand side of Eq. (10) can be expanded in wireline-like Taylor series with respect to the frequency, as:

$$\int_S\left\{\vec{H}_0{}^{M\alpha}\vec{h}\right\}dS \approx b_0 + (-i\omega\mu)b_1 + (-i\omega\mu)^{3/2}b_{3/2} + (-i\omega\mu)^2 b_2 + \ldots \tag{11}$$

Substituting Eq. (11) into Eq. (10) yields:

$${}^{(1)}H_\alpha = \tag{12}$$

-continued $$\frac{1}{\sqrt{\sigma_c}}\left(\frac{b_0}{(-i\omega\mu)^{1/2}} + (-i\omega\mu)^{1/2}b_1 + (-i\omega\mu)b_{3/2} + (-i\omega\mu)^{3/2}b_2 + \ldots\right)$$

Further substitution in Eqs. (7), (8), and (9) yield:

$$H_\alpha \approx H_\alpha^0 + \frac{1}{\sqrt{\sigma_c}}\left(\frac{b_0}{(-i\omega\mu)^{1/2}} + (-i\omega\mu)^{1/2}b_1 + (-i\omega\mu)b_{3/2} + (-i\omega\mu)^{3/2}b_2 + \ldots\right) \tag{13}$$

Considering measurement of imaginary component of the magnetic field, Equation (5), modified for MWD applications has the following form:

$$\begin{pmatrix} H(\omega_1) \\ H(\omega_2) \\ \cdot \\ \cdot \\ \cdot \\ H(\omega_{m-1}) \\ H(\omega_m) \end{pmatrix} = \begin{pmatrix} \omega_1^{1/2} & \omega_1^1 & \omega_1^{3/2} & \omega_1^{5/2} & \circ\circ\circ & \omega_1^{n/2} \\ \omega_2^{1/2} & \omega_2^1 & \omega_2^{3/2} & \omega_2^{5/2} & \circ\circ\circ & \omega_2^{n/2} \\ \circ & \circ & \circ & \circ & \circ\circ\circ & \circ \\ \circ & \circ & \circ & \circ & \circ\circ\circ & \circ \\ \circ & \circ & \circ & \circ & \circ\circ\circ & \circ \\ \omega_{m-1}^{1/2} & \omega_{m-1}^1 & \omega_{m-1}^{3/2} & \omega_{m-1}^{5/2} & \circ\circ\circ & \omega_{m-1}^{n/2} \\ \omega_m^{1/2} & \omega_m^1 & \omega_m^{3/2} & \omega_m^{5/2} & \circ\circ\circ & \omega_m^{n/2} \end{pmatrix} \begin{pmatrix} s_{1/2} \\ s_1 \\ s_{3/2} \\ s_{5/2} \\ \circ \\ \circ \\ \circ \\ s_{n/2} \end{pmatrix}. \tag{14}$$

Details are given in the Appendix. The residual signal (third term) depends on the mandrel conductivity, but this dependence is negligible due to very large conductivity of the mandrel. Similar approaches may be considered for the voltage measurements.

In Eq. (13), the term $H_\alpha^0$ describes effect of PCM, and the second term containing parentheses describes the effect of finite conductivity. At relatively low frequencies, the main effect of finite conductivity is inversely proportional to $\omega^{1/2}$ and $\sigma^{1/2}$:

$$H_\alpha \approx H_\alpha^0 + \frac{1}{\sqrt{\sigma_c}}\left(\frac{b_0}{(-i\omega\mu)^{1/2}}\right) \tag{15}$$

Figure 4:
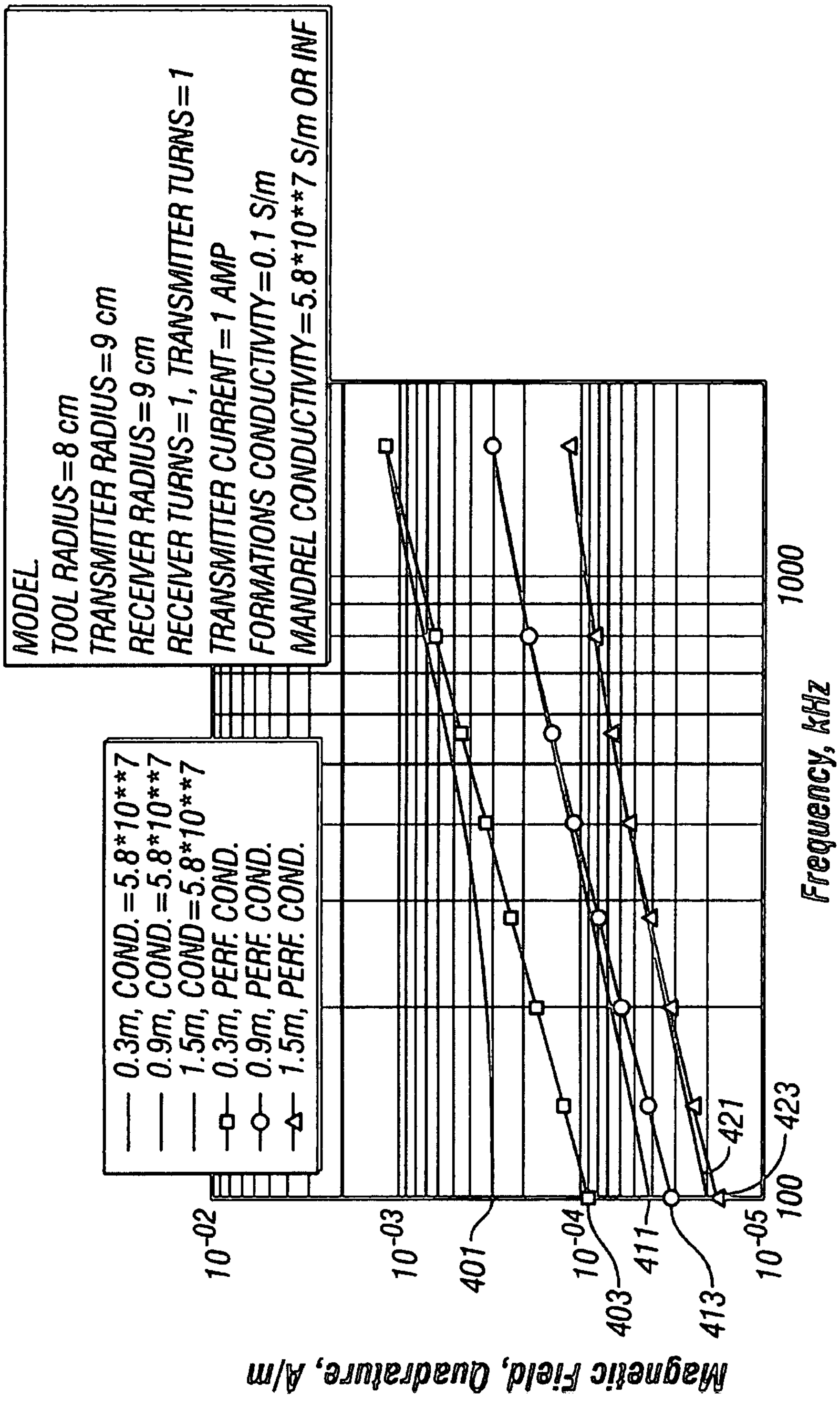
FIG. 4 (prior art) shows the effect of finite mandrel conductivity.
Figure 5:
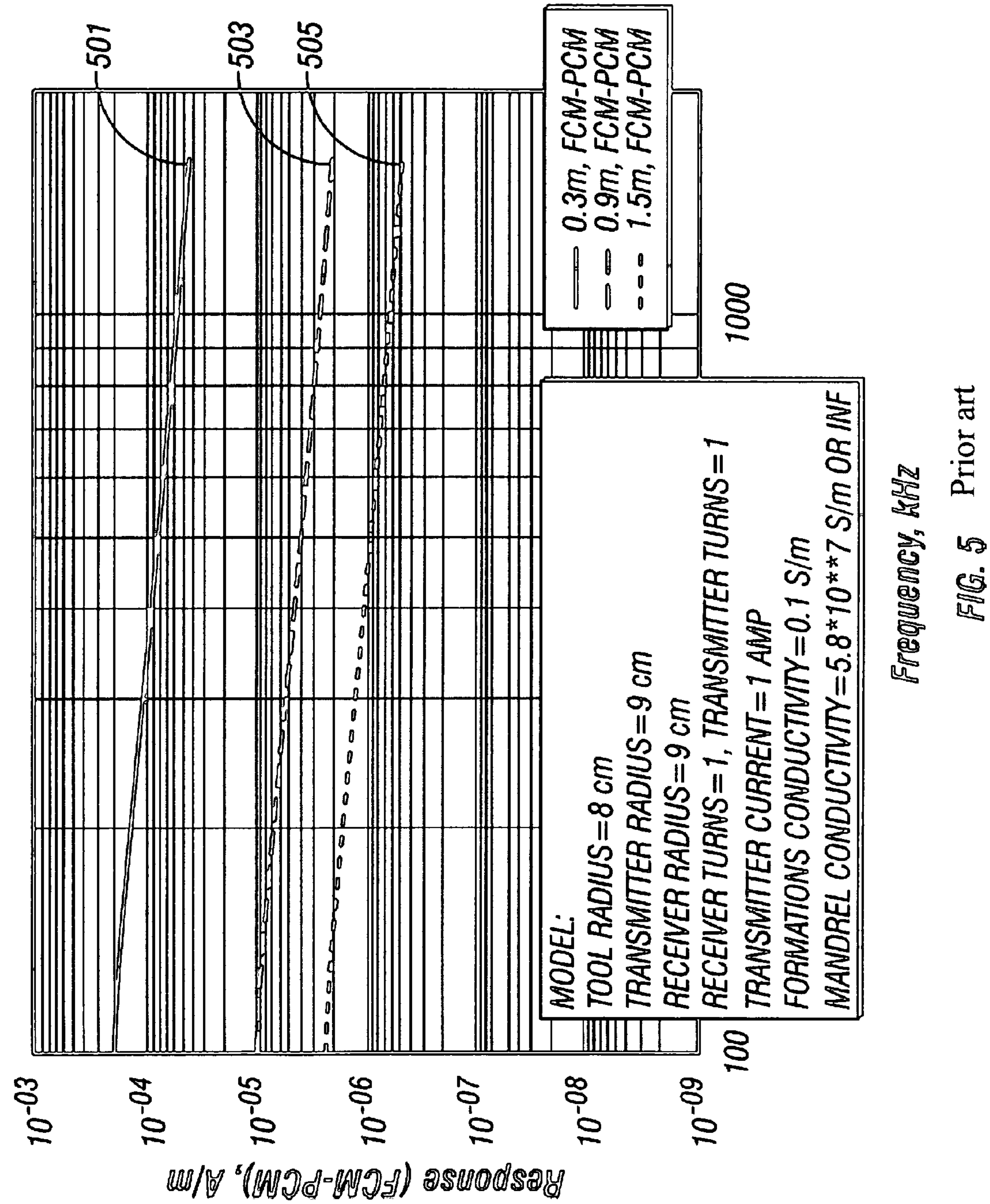
FIG. 5 (prior art) shows the difference between finite conducting mandrel and perfect conducting mandrel at several frequencies.

FIGS. 4 and 5 confirm the validity of Equation (15). Values shown in FIG. 4 are calculated responses of PCM and FCM tools in a uniform formation with conductivity of 0.1 S/m with a transmitter current of 1 Amp. FIG. 4 shows three pairs of data curves: 401 and 403; 411 and 413; and 421 and 423. Within each pairing, the differences of the individual curves are due only to the conductivity of the mandrel. Curves 401 and 403 are measured using a receiver separated from the transmitter by 0.3 m. Curve 401 is measured with a mandrel having $5.8*10^7$ S/m and Curve 403 assumes perfect conductivity. Similarly, curves 411 and 413 are measured using receiver separated from the transmitter by 0.9 m. Curve 411 is measured with a mandrel having $5.8*10^7$ S/m and Curve 413 assumes perfect conductivity. Lastly, curves 421 and 423 are measured using receiver separated from the transmitter by 1.5 m. Curve 421 is measured with a mandrel having $5.8*10^7$ S/m and Curve 423 assumes perfect conductivity. Curves 401, 411, 421, indicative of the curves for FCM diverge from curves 403, 413, and 423, respectively, in the manner shown in Eq. (15), (i.e., $1/\omega^{1/2}$ divergence).

FIG. 5 shows that, as a function of frequency, the difference of FCM and PCM responses follows the rule of $1/\omega^{1/2}$ with a very high accuracy. The scale value represents the difference in values between responses obtained for PCM and FCM (PCM-FCM in A/m) at several frequencies. Actual formation conductivity is 0.1 S/m. Curve 501 demonstrates this difference for a receiver-transmitter spacing of 0.3 m. Curves 503 and 505 demonstrate this difference for receiver transmitter spacing of 0.9 m and 1.5 m, respectively.

Figure 6:
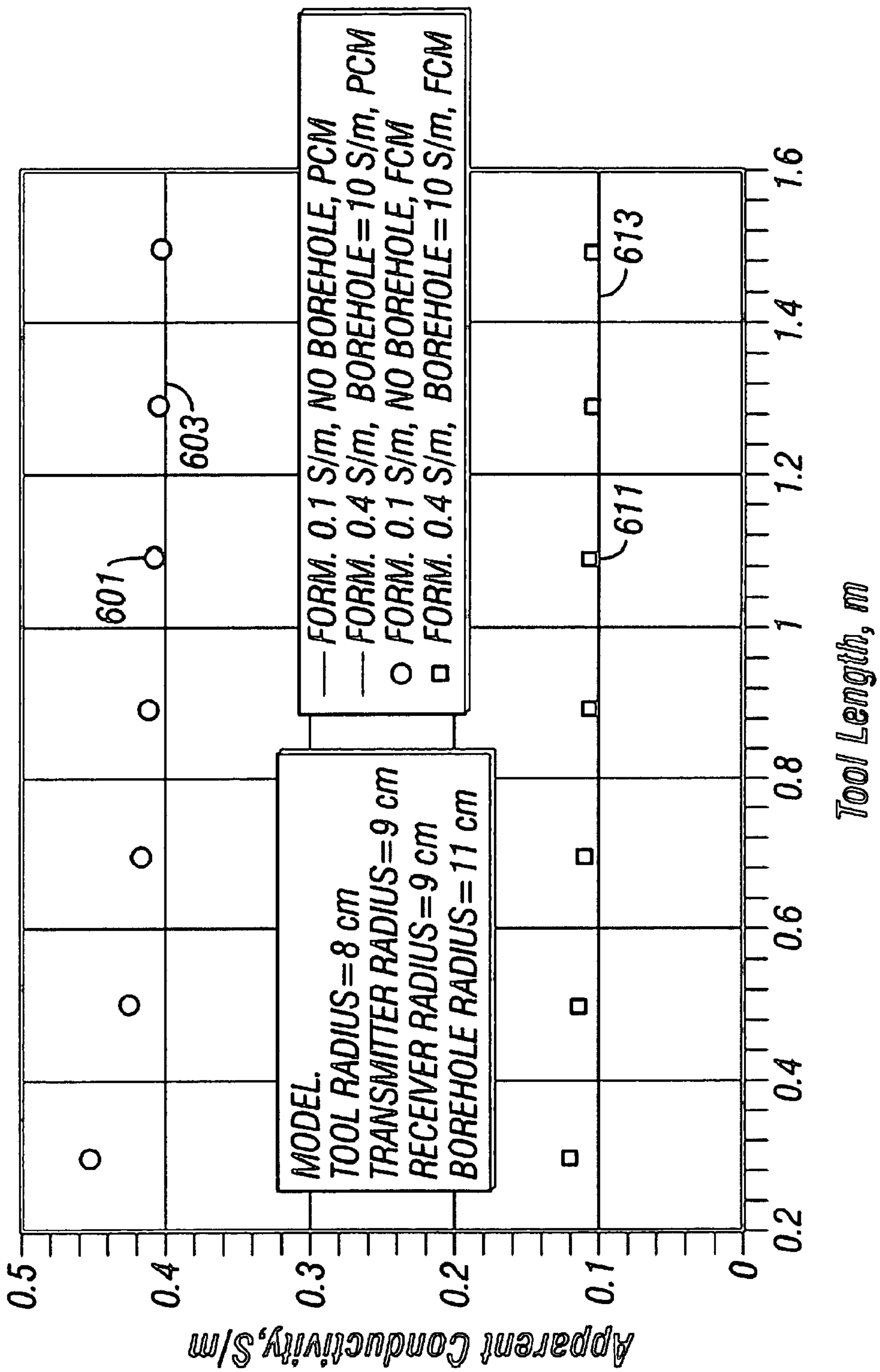
FIG. 6 (prior art) shows the effect of wireline multi-frequency focusing processing of data acquired with perfectly conducting mandrel and finite conducting mandrel.

FIG. 6 shows the inability of prior methods of MFFW to correct data acquired from FCM to that of PCM. The results are from conductivity measurements in a uniform space with conductivity of 0.1 S/m and in a space with conductivity 0.4 S/m containing a borehole. The borehole has a radius of 11 cm and a conductivity of 10 S/m. In both models, PCM and FCM responses are calculated and shown. In the FCM case, the mandrel conductivity is $2.8*10^7$ S/m. As mentioned previously, MFFW is applicable to PCM tools. FIG. 6 shows the results of PCM (603 and 613) do not depend on tool spacing and borehole parameters. Obtained values for apparent conductivity are very close to the real formation conductivity. However, for an FCM tool, such as 601 and 611, there is a dependence of MFFW on borehole parameters and tool length. The present invention addresses two of the major effects: the residual influence of the imperfect mandrel conductivity, and borehole effects.

Figure 7:
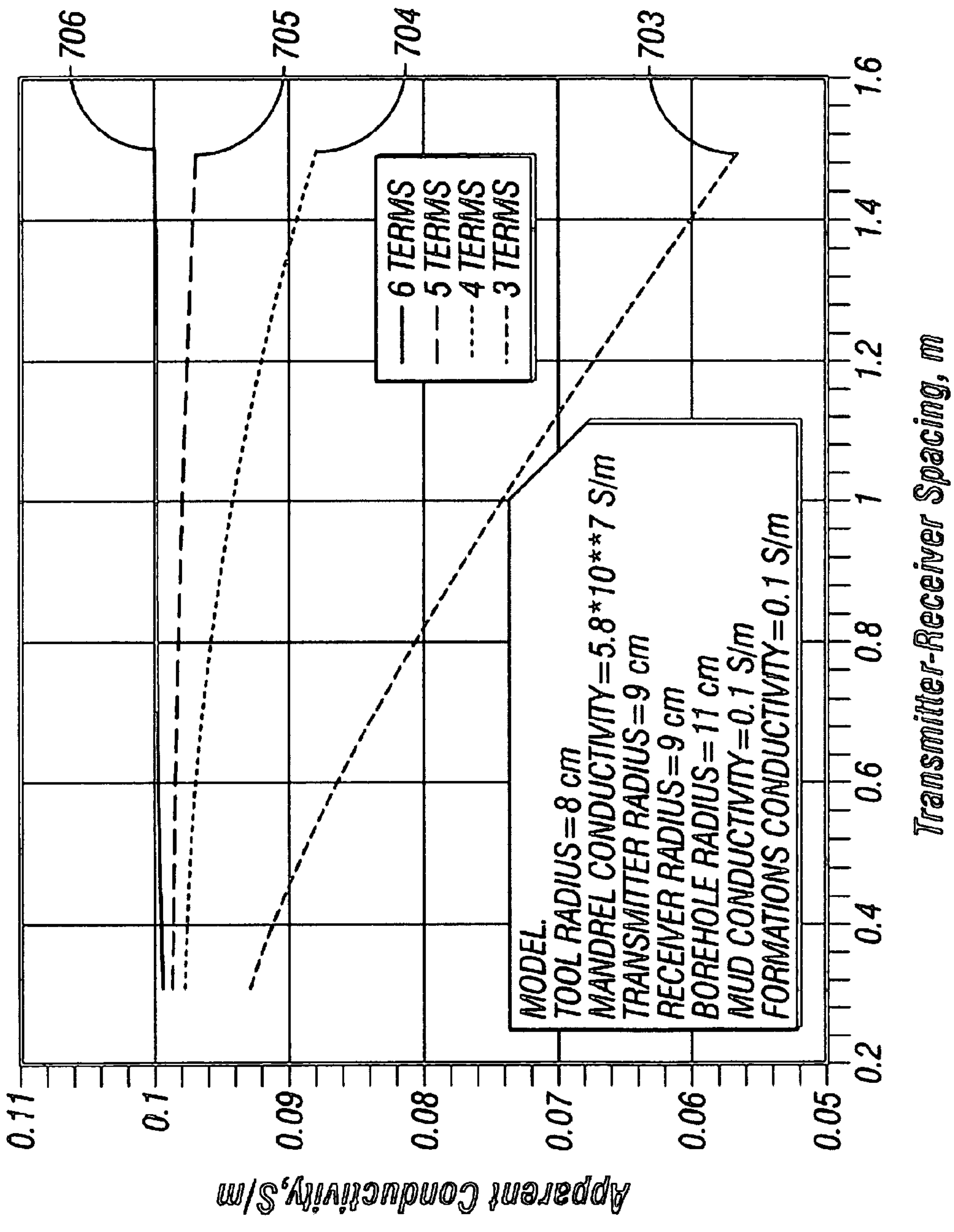
FIG. 7 (prior art) shows the convergence of the method of the present invention with the increased number of expansion terms.

FIG. 7 illustrates convergence of the method of the present invention as the number of terms in the expansion of Eq. (13) increases. Eight frequencies are used for the MFFM processing: 100, 140, 200, 280, 400, 460, 800, and 1600 kHz. Curve 703 shows results with an expansion having 3 terms. Curve 703 shows a large deviation from true conductivity at long tool length. Curves 704, 705, and 706 show results with an expansion having 4, 5, and 6 terms respectively. About 5 or 6 terms of the Taylor series are required for an accurate correction to true conductivity of 01 S/m. FIG. 7 also illustrates the ability of convergence regardless of tool length. Significantly, the factor k (equal to 15594 $S/(Amp/m^2)$) for transforming magnetic field to conductivity is independent of spacing.

Figure 8:
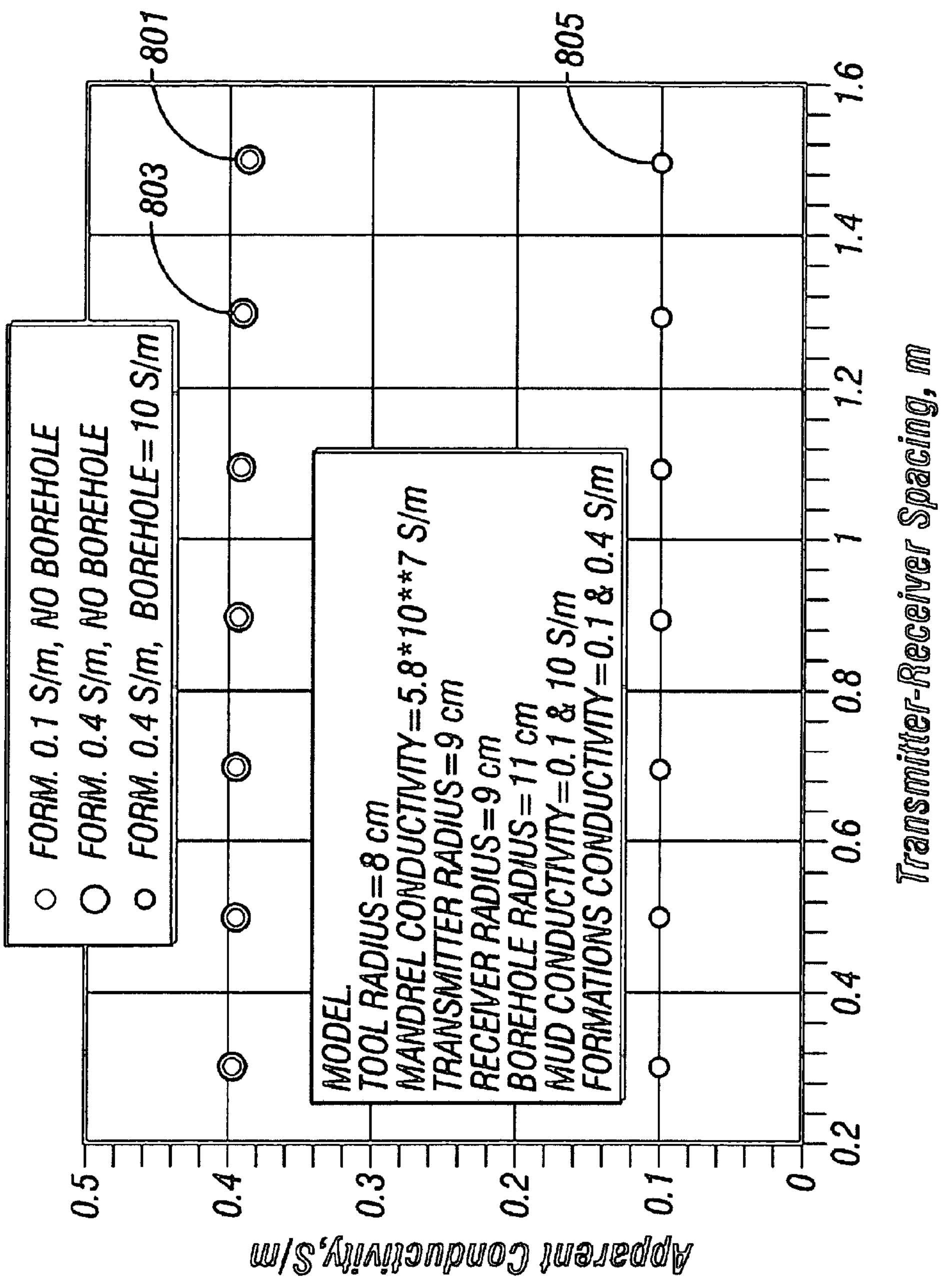
FIG. 8 shows multi-frequency focusing of the finite conducting mandrel response.

FIG. 8 presents the results of the method of the present invention in formations with and without borehole. Data points 801 and 805 show data received from formation having 0.4 S/m and 0.1 S/m respectively, with no borehole effects. Data points 803 shows data received from formation having conductivity 0.4 S/m with a borehole having 10 S/m. FIG. 8 shows that the effect of the borehole is completely eliminated by the method of the present invention. FIG. 8 also shows that after applying the method of the present invention, the value of the response data is independent of the spacing of the receivers. This second conclusion enables a tool design for deep-looking MWD tools using short spacing, further enabling obtaining data from the background formation (100 and 110 in FIG. 1A) and reducing difficulties inherent in data obtained from an invasion zone (103 in FIG. 1A). In addition, focused data are not affected by the near borehole environment. Results of FIG. 8 can be compared to FIG. 3.

We next address the issue of optimum design of the MFF acquisition system for deep resistivity measurements in the earth formation. One approach with limited value is a hardware design. This is based on the observation that at relatively low frequencies, the main effect of the finite conductivity can be described by the first term in the expansion. Since $b_0$ in eqn. (15) does not depend upon formation parameters, we can call this term the "direct field." The hardware design is based on the use of a 3-coil configuration for calibrating out the tool response in air. The use of such bucking coils is disclosed in U.S. Pat. No. 6,586,939 to Fanini et al, having the same assignee as the present invention and the contents of which are incorporated herein by reference.

Since the coefficient $b_0$ in eqn. (15) is slightly different for different frequencies, accurate compensation of the direct field is only possible for one frequency. For all other frequencies, the remaining direct field must be calibrated out numerically. Since the direct field is inversely proportional to the square root of the pipe conductivity, and the pipe conductivity will change with temperature, additional temperature correction may be used. The hardware solution requires the use of bucking coils. In Table I, we present signals for the main and bucking coils and the remaining direct field for a 3-coil tool at eight frequencies used for calibration in air. The drill pipe conductivity was taken as $1.4\times10^6$ S/m, which is a typical value for stainless steel. For the example shown, the spacings for the main and bucking receivers are 1.5.m and 1.0 m respectively. The 3-coil tool was fully compensated in air for a frequency of 38 kHz. The remaining signals are relatively small, allowing for a stable numerical calibration.

TABLE 1

| Frequency kHz | In-phase voltage Bucking coil in air (V) | In-phase voltage Main coil in air (V) | Unbalanced voltage 3-coil in air (V) | Numerical compensation % |
|---|---|---|---|---|
| 5 | 0.131E−06 | 0.398E−07 | 0.920E−10 | 0.23 |
| 11.2 | 0.192E−06 | 0.584E−07 | 0.695E−10 | 0.12 |
| 38 | 0.345E−06 | 0.105E−06 | 0.000E+00 | 0.00 |
| 85 | 0.512E−06 | 0.156E−06 | −0.139E−09 | −0.09 |
| 151 | 0.680E−06 | 0.207E−06 | −0.423E−09 | −0.20 |
| 293 | 0.946E−06 | 0.289E−06 | −0.143E−08 | −0.50 |
| 666 | 0.143E−05 | 0.443E−06 | −0.679E−08 | −1.53 |
| 999 | 0.177E−05 | 0.554E−06 | −0.148E−07 | −2.68 |

One drawback of the MFF processing, as in any software or hardware focusing technique, is subtraction of the signal and consequent noise amplification in the focused data. For example, if in the original signal the random error was 2% and after some focusing technique we eliminated 80% of the signal, the relative error in the resulting signal will become 10%. In this case, the relative noise in the focused data is 5 times higher than in the original signal. In the present invention, methods have been developed for estimating the noise amplification in the multi-frequency focusing and for optimizing the operating frequencies with respect to the noise amplification. As described in the appendix, we solve the following system of linear equations to extract the coefficient in the expansion that is proportional to the frequency $\omega^{3/2}$:

$$\begin{pmatrix} H(\omega_1) \\ H(\omega_2) \\ \cdot \\ \cdot \\ \cdot \\ H(\omega_{m-1}) \\ H(\omega_m) \end{pmatrix} = \begin{pmatrix} \omega_1^{1/2} & \omega_1^{1} & \omega_1^{3/2} & \omega_1^{5/2} & \circ\circ\circ & \omega_1^{n/2} \\ \omega_2^{1/2} & \omega_2^{1} & \omega_2^{3/2} & \omega_2^{5/2} & \circ\circ\circ & \omega_2^{n/2} \\ \circ & \circ & \circ & \circ & \circ\circ\circ & \circ \\ \circ & \circ & \circ & \circ & \circ\circ\circ & \circ \\ \circ & \circ & \circ & \circ & \circ\circ\circ & \circ \\ \omega_{m-1}^{1/2} & \omega_{m-1}^{1} & \omega_{m-1}^{3/2} & \omega_{m-1}^{5/2} & \circ\circ\circ & \omega_{m-1}^{n/2} \\ \omega_m^{1/2} & \omega_m^{1} & \omega_m^{3/2} & \omega_m^{5/2} & \circ\circ\circ & \omega_m^{n/2} \end{pmatrix} \begin{pmatrix} s_{1/2} \\ s_1 \\ s_{3/2} \\ s_{5/2} \\ \circ \\ \circ \\ \circ \\ s_{n/2} \end{pmatrix}. \quad \text{(A1.14)}$$

Or in short notations:

$$\vec{H}=\hat{A}\vec{s} \quad (16)$$

where A is the frequency matrix. Since we usually use more frequencies than the number of terms in expansions, we apply the least square approach to solve this equation:

$$\vec{s}=(\hat{A}^T\hat{A})^{-1}\hat{A}^T\vec{H}. \quad (17)$$

Since the matrix A depends only on the operating frequencies, we can try to optimize the frequency selection to provide the most stable solution of the linear system A1.13. This system can be rewritten in the form:

$$\vec{H}=s_{1/2}\vec{\omega}^{1/2}+s_1\vec{\omega}^{1}+s_{3/2}\vec{\omega}^{3/2}+\ldots+s_n\vec{\omega}^{n}, \quad (18)$$

where $$\vec{\omega}^{p}=(\omega_1^{p}, \omega_2^{p}, \ldots, \omega_m^{p})^T.$$

The frequency set $\omega_1, \omega_2, \ldots, \omega_m$ is optimal when the basis $\vec{\omega}^{1/2}, \vec{\omega}^{1}, \vec{\omega}^{3/2}, \ldots, \vec{\omega}^{n/2}$ as much linearly independent as possible. The measure of the linear independence of any basis is the minimal eigenvalue of the Gram matrix C of its vectors normalized to unity:

$$C_{i,j}=\left(\frac{\vec{\omega}^{p_i}}{\|\vec{\omega}^{p_i}\|}, \frac{\vec{\omega}^{p_j}}{\|\vec{\omega}^{p_j}\|}\right). \quad (19)$$

The matrix C can be equivalently defined as follows: we introduce matrix B as $$\hat{B}=\hat{A}^T\hat{A} \quad (20)$$

and normalize it $$C_{i,j}=\frac{B_{i,j}}{\sqrt{B_{i,i}B_{j,j}}}. \quad (21)$$

Then maximizing the minimum singular value of matrix C will provide the most stable solution for which we are looking. In the present invention, use is made of a standard SVD routine based on Golub's method to extract singular values of matrix C and the Nelder-Mead simplex optimization algorithm to search for the optimum frequency set. Details of the implementation are discussed below with reference to FIG. 12. Optimization was started with the HDIL frequency range (8 frequencies: 10, 14, 20, 28, 40, 56, 80, 160 kHz) but the program was allowed to search in a wider frequency range from 5 to 999 kHz. As a result of optimization, the following 8 frequencies were selected as optimum: 5, 11.2, 38, 85, 151, 293, 666, 999 kHz. The minimum singular value was six orders of magnitude higher for the optimum frequency set compared to the initial HDIL frequency range. We notice that the optimum frequency set includes the minimum and the maximum frequencies allowed in the optimization process, which makes sense for the interpolation problem (A1.14).

Eqn (17) can be rewritten as $$\vec{s}=\hat{D}\vec{H} \quad (22)$$

where $$\hat{D}=(\hat{A}^T\hat{A})^{-1}\hat{A}^T. \quad (23)$$

If an error distribution of the vector H is described by a covariation matrix ΣH, it can be shown that the error distribution for the vector s could be calculated as $$\hat{\Sigma}_s=\hat{D}\hat{\Sigma}_H\hat{D}^T \quad (24)$$

Assuming that the random noise in the magnetic field is independent at different frequencies (all non-diagonal elements in matrix $\Sigma_H$ are zeros), then the standard deviation (square root of the diagonal elements) can be calculated as a constant relative error (1% for all frequencies) multiplied by the signal at the particular frequency. To evaluate the error amplification in the coefficient j (Eq. A1.14), we use the following equation:

$$EA_j=100*\sqrt{\frac{\Sigma_{j,j}}{s_j}} \quad (25)$$

Figure 9:
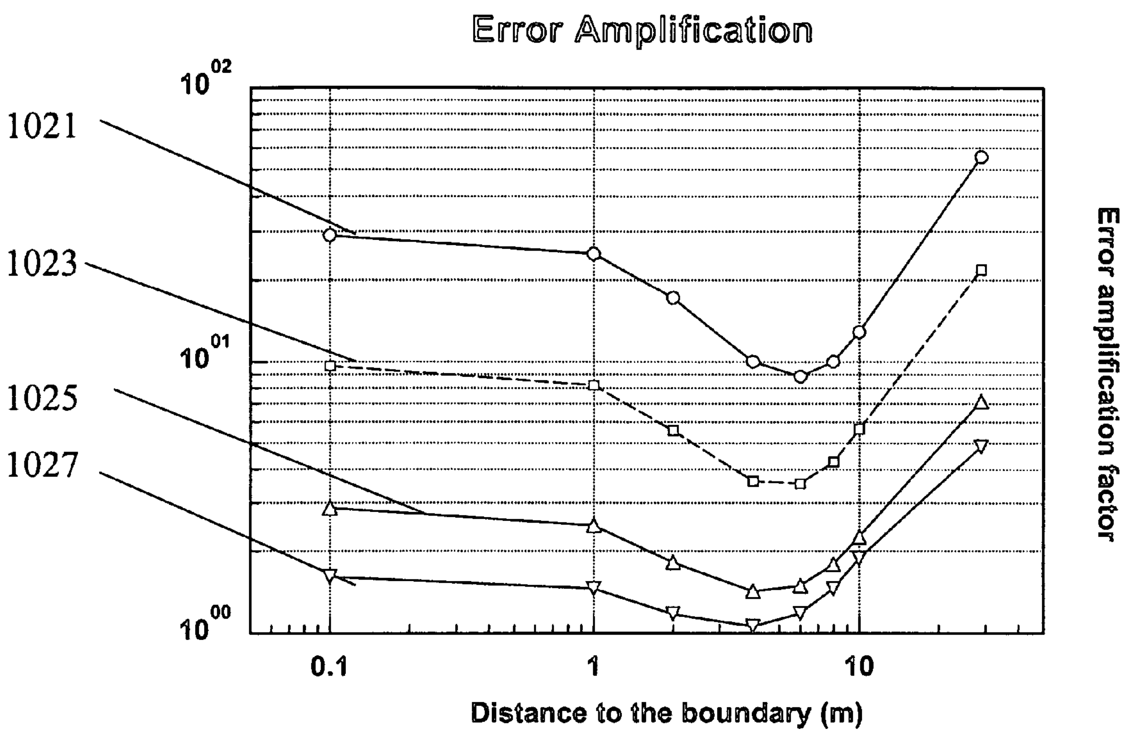
FIG. 9 shows MFF noise amplification for a 3-coil MWD tool on a steel pipe.

In one embodiment of the invention, we use j=3 for the coefficient with the frequency $\omega^{3/2}$ if we apply a rigorous expansion. In an alternate embodiment of the invention, we use j=2 and omit from the expansion a negligible term proportional to $\omega^{1/2}$. In FIG. 9, we present error amplification for a 3-coil MWD tool (L1=1.5 m, L2=1 m) on a steel pipe as a function of the distance to the remote layer. We consider four different MFF configurations.

(a) Wide frequency range (optimum set described above) with 4 terms in the expansion (excluding term proportional $\omega^{1/2}$) denoted by 1027;

(b) Wide frequency range with 5 terms, denoted by 1025;
(c) Narrow frequency range (HDIL range presented above) with 4 terms, denoted by 1023, and
(d) Narrow frequency range with 5 terms, denoted by 1021.

We can see that the error amplification factor is significantly smaller for the optimum set of frequencies compared to the HDIL frequency range (6–10 times depending on the number of terms). We can also observe that the optimum set of frequencies with 4 terms in the expansion almost does not amplify noise (the amplification factor is below 2 when the distance to the remote layer is smaller than 10 m). Because the MFF transformation has a low vertical resolution, we can apply spatial filtering to compensate for the MFF error amplification.

Figure 11:
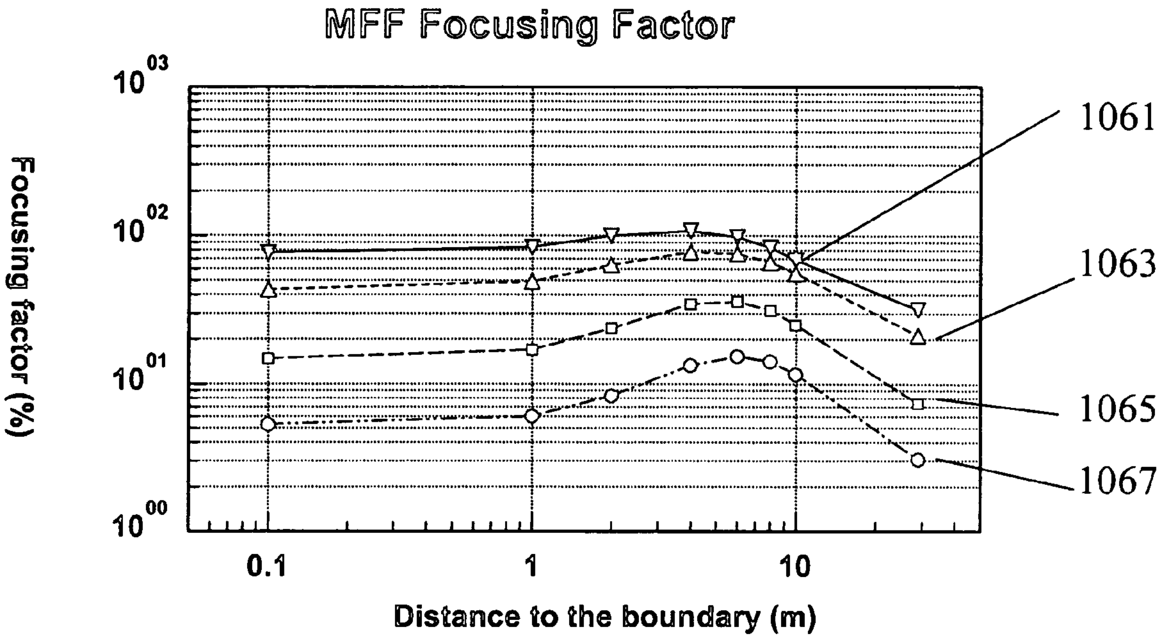
FIG. 11 shows the MFF Focusing factor for a 3-coil MWD tool on a steel pipe.
Figure 12:
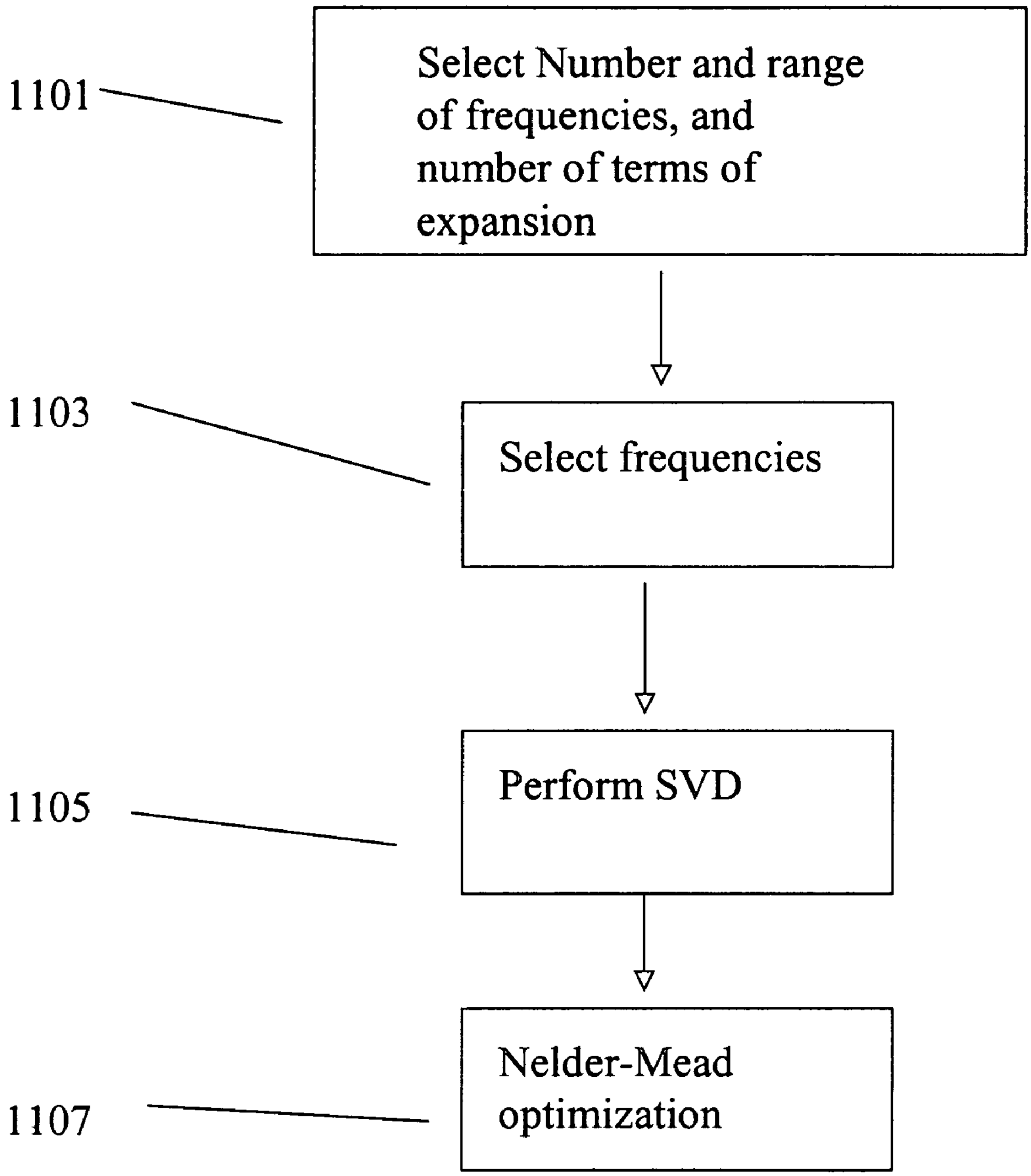
FIG. 12 is a flow chart illustrating a method of the present invention.

Still referring to FIG. 9, we notice that increasing the number of terms from 4 to 5 increases the error amplification factor 2 times for the wide frequency range and 3 times for the narrow frequency range. In FIG. 12, we present the MFF voltage (the rigorous definition of the MFF voltage is given below) for the same model and tool configurations as in FIG. 11. We observe that the signal levels for both frequency sets are higher for the 4-term expansion compared to the 5-term expansion. At the same time, a very small change occurring in the MFF signal when the boundary moves from 0.1 to 1 m indicates an excellent compensation of the near-borehole signal (the more number of terms, the less change in the MFF response).

The frequency Taylor series for the imaginary part of magnetic field has the following form:

$$Im(H)=\sum_{k=1}^{k=\infty} s_{\frac{k}{2}}\,\omega^{\frac{k}{2}} \quad (23)$$

$$s_{2j}=0;\quad j=1,2,\ldots,.$$

Transforming the series to a new variable $\omega\mu$, we can express the imaginary part of the magnetic field measured at an angular frequency $\omega$ as $$H(\omega)=MFF\cdot(\omega\mu)^{3/2}+\text{OtherTerms}, \quad (24)$$

Here, MFF is a coefficient $s_{3/2}$ obtained by solving the system A1.14 using $\omega\mu$ rather than $\omega$. For illustrative purposes, we assume that:
(a) the transmitter has a single turn and effective area $S_t$ (total area minus area occupied by the metal pipe);
(b) the transmitter current equals 1 Amp;
(c) the receiver has a single turn and effective area $S_r$.

Rewriting Eq. (24) for the listed conditions, we obtain $$V(\omega)=MFF\cdot(\omega\mu)^{5/2}\cdot S_t\cdot S_r+\text{OtherTerms}. \quad (25)$$

Based on Eq. (25), we define the MFF voltage as $$MFF_V=MFF\cdot(\omega\mu)^{5/2}\cdot S_t\cdot S_r. \quad (26)$$

Next, we address the issue of what frequencies to choose in Eqn. (26) from the multiple frequencies used to solve the system A1.14. We decided to select the frequency at which the signal contributes most to the MFF result and assign this frequency a unit moment—similar to the way the signal levels are evaluated in multi-receiver geometrical focusing systems. For this purpose, we express the MFF signal as a sum of signals at all the frequencies with different coefficients. Let us start from the magnetic fields:

$$MFF=\sum_{i=1}^{m}\alpha_i H_i, \quad (27)$$

where m is the total number of frequencies; $H_i$-magnetic field measured at frequency i. We can define the coefficients $\alpha_i$ as $$\alpha_i=\hat{D}(3,i), \quad (28)$$

where $\hat{D}(3,i)$ means element i of the third row of the matrix D. Following Eqn. (26), we can rewrite Eqn. (27) in terms of voltages:

$$MFF_v=\sum_{i=1}^{m}\beta_i V_i, \quad (29)$$

where $$\beta_i=\alpha_i\cdot\frac{(\omega_{\max}\mu)^{5/2}}{\omega_i\mu}. \quad (30)$$

Based on eqns. (28) and (30), we can evaluate the contribution of every term in eqn.(29), find the main one, and select the frequency for the MFF voltage calculations, eqn. (26). In all our benchmarks, for both sets of frequencies, the main contribution derives from the lowest frequency (there were only two cases where the second frequency contribution was slightly higher). In Table 2, we present the contribution of each frequency to the MFF response for the 3-coil MWD tool. The tool has a steel pipe with a wide frequency range and 4 terms used in the expansion. Each column in Table 2 represents a model with the different distance to the remote boundary. The voltage is normalized by $IS_tS_r(\omega_{max}\mu)^{5/2}$ where I represents the transmitter current.

TABLE 2

| | Contribution of each frequency term into MFF voltage | | | | | | | |
|---|---|---|---|---|---|---|---|---|
| f(kHz) | 0.1 m | 1 m | 2 m | 4 m | 6 m | 8 m | 10 m | 29 m |
| 5.00 | −0.168E−1 | −0.133E−1 | −0.769E−2 | −0.350E−2 | −0.209E−2 | −0.147E−2 | −0.116E−2 | −0.766E−3 |
| 11.2 | −0.939E−2 | −0.729E−2 | −0.402E−2 | −0.166E−2 | −0.953E−3 | −0.680E−3 | −0.560E−3 | −0.454E−3 |
| 38.0 | 0.138E−2 | 0.103E−2 | 0.506E−3 | 0.179E−3 | 0.106E−3 | 0.862E−4 | 0.795E−4 | 0.798E−4 |
| 85.0 | 0.555E−2 | 0.403E−2 | 0.176E−2 | 0.605E−3 | 0.418E−3 | 0.383E−3 | 0.377E−3 | 0.397E−3 |
| 151. | 0.521E−2 | 0.378E−2 | 0.154E−2 | 0.572E−3 | 0.457E−3 | 0.452E−3 | 0.460E−3 | 0.483E−3 |
| 293. | 0.164E−2 | 0.131E−2 | 0.518E−3 | 0.243E−3 | 0.232E−3 | 0.240E−3 | 0.248E−3 | 0.255E−3 |

TABLE 2-continued

| | Contribution of each frequency term into MFF voltage | | | | | | | |
|---|---|---|---|---|---|---|---|---|
| f(kHz) | 0.1 m | 1 m | 2 m | 4 m | 6 m | 8 m | 10 m | 29 m |
| 666. | −0.318E−3 | −0.866E−3 | −0.400E−3 | −0.299E−3 | −0.331E−3 | −0.348E−3 | −0.354E−3 | −0.355E−3 |
| 999. | −0.145E−3 | 0.175E−3 | 0.100E−3 | 0.987E−4 | 0.111E−3 | 0.116E−3 | 0.116E−3 | 0.116E−3 |

To assure that the main term coefficient is equal to 1, we divide all coefficients by βmax.

Then Eqn. (26) becomes $$MFF_V=MFF\cdot(\omega_{max}\mu)^{5/2}\cdot S_t\cdot S_r/\beta_{max}. \quad (31)$$

Figure 10:
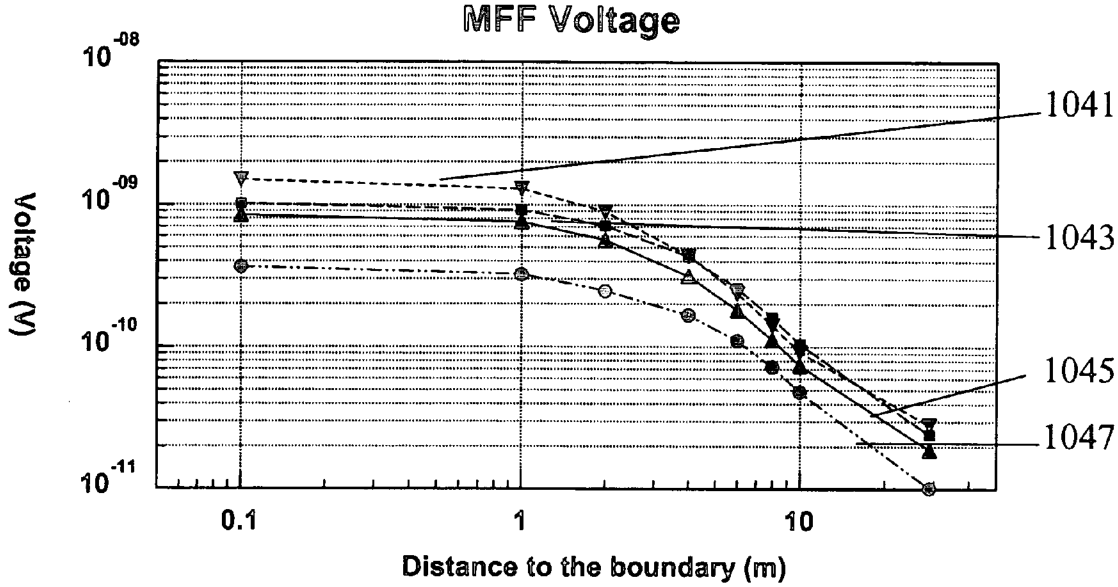
FIG. 10 shows the MFF voltage for a 3-coil MWD tool on a steel pipe.

In FIG. 10, we present an example of the MFF voltage calculated for the 3-coil MWD tool (L1=1.5 m, L2=1 m) on a steel pipe for four different MFF configurations (two frequency sets for 4 and 5 terms in the expansion A1.14). We can observe that the configuration with a wide frequency range with 4 terms provides the highest signal level compared to the other three configurations. After introducing the MFF voltage we can estimate how much signal we lose in our focusing system. Actually, we estimate how much signal is left in the MFF transformation as a ratio of the MFF voltage to the voltage measured at the frequency with the largest contribution into the MFF signal. We call this the MFF focusing factor and express it as a percentage:

$$\text{MFF\_Focusing\_Factor} = 100\cdot\frac{\text{MFF\_voltage}}{V(\omega_{\max})}. \quad (32)$$

In FIG. 11, we present the MFF focusing factor calculated for a steel pipe MWD tool for the same benchmark and MFF configurations as discussed earlier for FIGS. 11 and 12. We can see that for a 10-m distance to the remote cylindrical layer the best configuration with a wide frequency range and 4 terms cancels only 30% of the signal (leaves 70%) and the worst configuration (narrow frequency range and 5 terms) cancels almost 90% of the signal. 1061 and 1063 correspond to the wide frequency band, four and five terms respectively, while 1065 and 1067 correspond to the narrow frequency band, four and five terms respectively.

Let us discuss the maxima of the MFF Focusing Factor. We can observe that they well agree with the minima on the Error Amplification curves, FIG. 9, and these positions are very consistent for all benchmark models. We believe that these maxima reflect the depths at which sensitivity of the particular MFF configurations are most favorable. For example, the narrow frequency, five term configuration has a maximum sensitivity at about 6–7 m, while wide frequency four term configuration has a maximum at about 4–5 m. This correlates with the fact that the narrow frequency, five term configuration has the lowest focusing factor and the largest error amplification.

The present invention has been discussed with reference to a MWD sensing device conveyed on a BHA. The method is equally applicable for wireline conveyed devices. In particular, the method of selecting frequencies can be used even for the case where the mandrel has either zero conductivity or infinite conductivity. The difference is that instead of equation (A1.14), we use an equation that does not have the mandrel term, i.e.

$$\begin{pmatrix} H(\omega_1) \\ H(\omega_2) \\ \vdots \\ H(\omega_{m-1}) \\ H(\omega_m) \end{pmatrix} = \begin{pmatrix} \omega & \omega_1^{3/2} & \omega_1^{5/2} & \cdots & \omega_1^{n/2} \\ \omega & \omega_2^{3/2} & \omega_2^{5/2} & \cdots & \omega_2^{n/2} \\ \circ & \circ & \circ & \circ\circ\circ & \circ \\ \circ & \circ & \circ & \circ\circ\circ & \circ \\ \circ & \circ & \circ & \circ\circ\circ & \circ \\ \omega & \omega_{m-1}^{3/2} & \omega_{m-1}^{5/2} & \cdots & \omega_{m-1}^{n/2} \\ \omega & \omega_m^{3/2} & \omega_m^{5/2} & \cdots & \omega_m^{n/2} \end{pmatrix} \begin{pmatrix} S_1 \\ S_{3/2} \\ S_{5/2} \\ \vdots \\ S_{n/2} \end{pmatrix}. \quad (31)$$

Turning now to FIG. 12, we discuss the determination of an optimal frequency step. At 1101, the number or frequencies, the range of frequencies and the number of terms of the expansion (n in eqn. A1.14 or eqb. 31) are selected. As noted above, the number and initial values of frequencies selected was taken from the prior art HDIL tool, i.e., 10, 14, 20, 28, 40, 56, 80 and 160 kHz. This is a matter of convenience since the hardware for operating the logging tool at eight frequencies already existed. Other choices are available and are intended to be covered by the scope of the present invention. The allowable range is also somewhat limited by the hardware-as noted above, the optimum frequency set included the minimum and maximum frequencies allowed in the optimization process. The number of terms in the expansion is a tradeoff between two conflicting requirements. Increasing the number of terms does a better job of correcting for near borehole effects, but also reduces the MFF signal and increases the noise level. Our experience has shown that typically, a four or five term expansion is adequate for an eight frequency tool. Clearly, the number of terms of the expansion has to be less than the number of frequencies used. The initial values for the frequencies is specified 1103. A singular value decomposition is performed 1105 to get the singular values of the matrix C from eqn. (21). Next, for the range of frequencies and the number of frequencies, the set of frequencies that gives the largest value for the minimum singular eigenvalue of C is determined 1107.

Such an optimization process could be carried out with brute force gradient based techniques at a high computational cost. In the present invention, the Nelder-Mead method is used for the optimization. The Nelder-Mead method does not require the computation of gradients. Instead, only a scalar function (in the present instance, the minimum singular eigenvalue) is used and the problem is treated as a simplex problem in n+1 dimensions. Another advantage of simplex methods is their ability to get out of local minima—a known pitfall of gradient based techniques.

Figure 13:
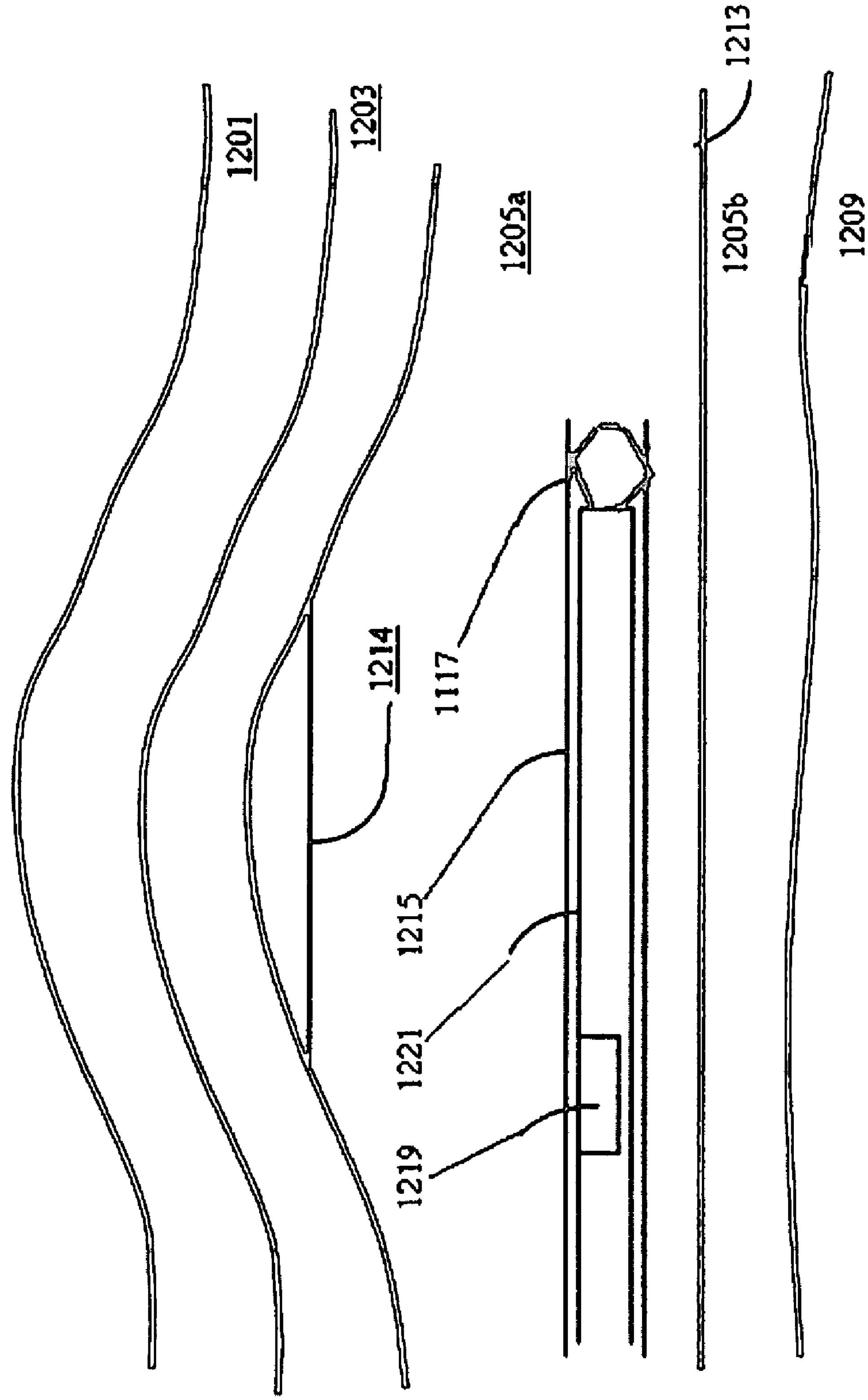
FIG. 13 shows an MWD tool in the context of reservoir navigation.

One application of the method of the present invention (with its ability to make resistivity measurements up to 20 m away from the borehole) is in reservoir navigation. In development of reservoirs, it is common to drill boreholes at a specified distance from fluid contacts within the reservoir. An example of this is shown in FIG. 13 where a porous formation denoted by 1205*a*, 1205*b* has an oil water contact denoted by 1213. The porous formation is typically capped by a caprock such as 1203 that is impermeable and may further have a non-porous interval denoted by 1209 underneath. The oil-water contact is denoted by 1213 with oil above the contact and water below the contact: this relative positioning occurs due to the fact the oil has a lower density than water. In reality, there may not be a sharp demarcation defining the oil-water contact; instead, there may be a transition zone with a change from high oil saturation at the top to a high water saturation at the bottom. In other situations, it may be desirable to maintain a desired spacing from a gas-oil. This is depicted by 1214 in FIG. 13. It should also be noted that a boundary such as 1214 could, in other situations, be a gas-water contact.

In order to maximize the amount of recovered oil from such a borehole, the boreholes are commonly drilled in a substantially horizontal orientation in close proximity to the oil water contact, but still within the oil zone. U.S. Pat. No. RE35,386 to Wu et al, having the same assignee as the present application and the contents of which are fully incorporated herein by reference, teaches a method for detecting and sensing boundaries in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The configuration used in the Wu patent is schematically denoted in FIG. 13 by a borehole 125 having a drilling assembly 1221 with a drill bit 1217 for drilling the borehole. The resistivity sensor is denoted by 1219 and typically comprises a transmitter and a plurality of sensors.

As noted above, different frequency selections/expansion terms have their maximum sensitivity at different distances. Accordingly, in one embodiment of the invention, the frequency selection and the number of expansion terms is based on the desired distance from an interface in reservoir navigation. It should be noted that for purposes of reservoir navigation, it may not be necessary to determine an absolute value of formation resistivity: changes in the focused signal using the method described above are indicative of changes in the distance to the interface. The direction of drilling may be controlled by a second processor or may be controlled by the same processor that processes the signals.

While the foregoing disclosure is directed to the preferred embodiments of the invention, various modifications will be apparent to those skilled in the art. It is intended that all such variations within the scope and spirit of the appended claims be embraced by the foregoing disclosure.

Appendix: Taylor's Frequency Series for MWD Electromagnetic Tool

We intend to evaluate the asymptotic behavior of magnetic field on the surface of a metal mandrel as described in Eq. (6):

$$H_\alpha(P) = H_\alpha^0(P) + \beta\int_S \left\{\vec{H}^{M\alpha}\vec{h}\right\} dS \quad \text{(A1.1)}$$

The primary and auxiliary magnetic fields, $H_\alpha^0$ and ${}^{M\alpha}\vec{h}$, depend only on formation parameters. The total magnetic filed, $H_\alpha$, depends on both formation parameters and mandrel conductivity. The dependence on mandrel conductivity, $\sigma_c$, is reflected only in parameter β:

$$\beta = \frac{1}{k_c} = \frac{1}{\sqrt{-i\omega\mu\sigma_c}} \quad \text{(A1.2)}$$

The perturbation method applied to Eq. (A1.1) leads to the following result:

$$H_\alpha = \sum_{i=0}^{i=\infty} {}^{(i)}H_\alpha \quad \text{(A1.3)}$$

$${}^{(0)}H_\alpha = H_\alpha^0 \quad \text{(A1.4)}$$

$${}^{(i)}H_\alpha = \beta\int_S \left\{{}^{(i-1)}\vec{H}^{M\alpha}\vec{h}\right\} dS \quad \text{(A1.5)}$$

$$i = 1, \ldots, \infty$$

Let us consider the first order approximation that is proportional to the parameter β:

$${}^{(1)}H_\alpha = \beta\int_S \left\{{}^{(0)}\vec{H}^{M\alpha}\vec{h}\right\} dS = \beta\int_S \left\{\vec{H}_0{}^{M\alpha}\vec{h}\right\} dS \quad \text{(A1.6)}$$

The integrand in Eq. (A1.6) does not depend on mandrel conductivity. Therefore, the integral in right-hand side, Eq. (A1.6), may be expanded in wireline-like Taylor series with respect to the frequency:

$$\int_S \left\{\vec{H}_0{}^{M\alpha}\vec{h}\right\} dS \approx b_0 + (-i\omega\mu)b_1 + (-i\omega\mu)^{3/2}b_{3/2} + (-i\omega\mu)^2 b_2 + \cdots \quad \text{(A1.7)}$$

In axially symmetric models, coefficients $b_j$ have the following properties:

- $b_0$ does not depend on formation parameters. It is related to so called 'direct field';
- $b_1$ is linear with respect to formation conductivity. It is related to Doll's approximation;
- $b_{3/2}$ depends only on background conductivity and does not depend on near borehole parameters;
- $b_2$ includes dependence on borehole and invasion.

Let us substitute Eq. (A1.7) into Eq. (A1.6):

$${}^{(1)}H_\alpha = \frac{1}{\sqrt{\sigma_c}}\left(\frac{b_0}{(-i\omega\mu)^{1/2}} + \right. \quad \text{(A1.8)}$$

-continued $$(-i\omega\mu)^{1/2}b_1 + (-i\omega\mu)b_{3/2} + (-i\omega\mu)^{3/2}b_2 + \cdots\Big)$$

Eq. (A3.3), (A3.4), and (A3.8) yield:

$$(-i\omega\mu)^{3/2}(H_\alpha)_{3/2} \approx (-i\omega\mu)^{3/2}(H_\alpha^0)_{3/2} + \frac{(-i\omega\mu)^{3/2}b_2}{\sqrt{\sigma_c}} \quad \text{(A1.10)}$$

Collecting traditionally measured in MFF terms $\sim\omega^{3/2}$, we obtain:

$$-(i\omega\mu)^{3/2}(H_\alpha)_{3/2} \approx (-i\omega\mu)^{3/2}(H_\alpha^0)_{3/2} + \frac{(-i\omega\mu)^{3/2}b_2}{\sqrt{\sigma_c}} \quad \text{(A1.10)}$$

The first term in the right hand side, Eq. (A1.10), depends only on background formation. The presence of imperfectly conducting mandrel makes the MFF measurement dependent also on a near borehole zone parameters (second term, coefficient $b_2$) and mandrel conductivity, $\sigma_c$. This dependence, obviously, disappears for a perfect conductor ($\sigma_c \rightarrow \infty$). We should expect a small contribution from the second term since conductivity $\sigma_c$ is very large.

To measure the term $\sim\omega^{3/2}$, we can modify MFF transformation in such a way that contributions proportional to $1/(-i\omega\mu)^{1/2}$ and $(-i\omega\mu)^{1/2}$, Eq. (A1.9), are cancelled. We also can achieve the goal by compensating the term $\sim 1/(-i\omega\mu)^{1/2}$ in the air and applying MFF to the residual signal. The latter approach id preferable because it improves the MFF stability (less number of terms needs to be compensated). Let us consider a combination of compensation in the air and MFF in more detail. It follows from Eq. (A1.9) that the response in the air, $H_\alpha(\sigma=0)$, may be expressed in the following form:

$$H_\alpha(\sigma = 0) \approx H_\alpha^0(\sigma = 0) + \frac{1}{\sqrt{\sigma_c}}\left(\frac{b_0}{(-i\omega\mu)^{1/2}}\right) \quad \text{(A1.11)}$$

Compensation of the term $\sim b_0$, Eq. (A1.11), is important. Physically, this term is due to strong currents on the conductor surface and its contribution (not relating to formation parameters) may be very significant. Equations (A1.9) and (A1.11) yield the following compensation scheme:

$$H_\alpha - H_\alpha(\sigma = 0) \approx (-i\omega\mu)(H_\alpha)_1 + (-i\omega\mu)^{3/2}(H_\alpha)_{3/2} + \frac{1}{\sqrt{\sigma_c}}\left((-i\omega\mu)^{1/2}b_1 + (-i\omega\mu)b_{3/2} + (-i\omega\mu)^{3/2}b_2 + \ldots\right) \quad \text{(A1.12)}$$

Considering measurement of imaginary component of the magnetic field, we obtain:

$$\mathrm{Im}[H_\alpha - H_\alpha(\sigma = 0)] \approx -\left\{\frac{1}{\sqrt{\sigma_c}}\left(\frac{\omega\mu}{\sqrt{2}}\right)^{1/2} b_1 + \omega\mu(H_\alpha)_1 + \left(\frac{\omega\mu}{\sqrt{2}}\right)^{3/2}\left((H_\alpha)_{3/2} + \frac{b_2}{\sqrt{\sigma_c}}\right)\right\} \quad \text{(A1.13)}$$

Equation (A1.13) indicates that in MWD applications, two frequency terms must be cancelled as opposed to only one term in wireline. Equation, (A1.4), modified for MWD applications has the following form:

$$\begin{pmatrix} H(\omega_1) \\ H(\omega_2) \\ \cdot \\ \cdot \\ \cdot \\ H(\omega_{m-1}) \\ H(\omega_m) \end{pmatrix} = \begin{pmatrix} \omega_1^{1/2} & \omega_1^1 & \omega_1^{3/2} & \omega_1^{5/2} & \bullet\bullet\bullet & \omega_1^{n/2} \\ \omega_2^{1/2} & \omega_2^1 & \omega_2^{3/2} & \omega_2^{5/2} & \bullet\bullet\bullet & \omega_2^{n/2} \\ \bullet & \bullet & \bullet & \bullet & \bullet\bullet\bullet & \bullet \\ \bullet & \bullet & \bullet & \bullet & \bullet\bullet\bullet & \bullet \\ \bullet & \bullet & \bullet & \bullet & \bullet\bullet\bullet & \bullet \\ \omega_{m-1}^{1/2} & \omega_{m-1}^1 & \omega_{m-1}^{3/2} & \omega_{m-1}^{5/2} & \bullet\bullet\bullet & \omega_{m-1}^{n/2} \\ \omega_m^{1/2} & \omega_m^1 & \omega_m^{3/2} & \omega_m^{5/2} & \bullet\bullet\bullet & \omega_m^{n/2} \end{pmatrix} \begin{pmatrix} s_{1/2} \\ s_1 \\ s_{3/2} \\ s_{5/2} \\ \bullet \\ \bullet \\ \bullet \\ s_{n/2} \end{pmatrix}. \quad \text{(A1.14)}$$

The residual signal (third term) depends on the mandrel conductivity but the examples considered in the report illustrate that this dependence is negligible due to very large conductivity of the mandrel. Similar approaches may be considered for the voltage measurements.

The invention claimed is:

1. A method of determining a resistivity of an earth formation comprising:

(a) conveying a resistivity measuring instrument having at least one transmitter and at least one receiver spaced apart from said at least one transmitter;

(b) activating said at least one transmitter at a number m of frequencies having selected associated values ($\omega_i$, i=1,m) and inducing signals in said at least one receiver, said induced signals indicative of said resistivity of said earth formation; and (c) applying a multifrequency focusing (MFF) to said induced signals to give a focused signal;

wherein said associated values are selected to increase linear independence of vectors defined at least in part by said associated values and a number of terms n of said MFF.

2. The apparatus of claim 1 wherein said resistivity measuring instrument has a mandrel (housing) with a portion having a finite, non-zero conductivity and wherein said MFF accounts for said finite, non-zero conductivity.

3. The method of claim 1 wherein said vectors are defined as $$\vec{\omega}^{1/2}, \vec{\omega}^{1}, \vec{\omega}^{3/2}, \ldots \vec{\omega}^{n/2}, \text{ with}$$

$\vec{\omega}=[\omega_1, \omega_2, \ldots \omega_m]^T$, where $[.]^T$ denotes a transpose.

4. The method of claim 2 wherein said vectors are defined as $$\vec{\omega}^{1}, \vec{\omega}^{3/2}, \ldots \vec{\omega}^{n/2}, \text{ with}$$

$\vec{\omega}=[\omega_1, \omega_2, \ldots \omega_m]^T$, where $[.]^T$ denotes a transpose.

5. The method of claim 1 further comprising selecting said associated values based at least in part on a singular value decomposition (SVD) of a matrix determined from said vectors.

6. The method of claim 1 further comprising selecting said associated values and said number of terms of said MFF based at least in part on an error amplification of said MFF.

7. The method of claim 1 further comprising selecting said associated values and said number of terms of said MFF based at least in part on an MFF voltage related to said MFF.

8. The method of claim 1 comprising selecting said associated values and said number of terms of said MFF based at least in part on an MFF focusing factor.

9. The method of claim 1 further comprising determining a formation resistivity from said focused signal.

10. The method of claim 2 wherein said resistivity measuring instrument is conveyed on a bottomhole assembly (BHA) into said borehole, said BHA having a device for extending said borehole, the method further comprising determining a distance to an interface based at least in part on said determined resistivity.

11. The method of claim 10 further comprising altering a direction of drilling of said BHA based at least in part on said determined distance.

12. The method of claim 2 wherein said resistivity measuring instrument is conveyed on a bottomhole assembly (BHA) into said borehole, said BHA having a device for extending said borehole, the method further comprising:

(i) monitoring a change in said focused signal during continued drilling of said wellbore, and (ii) controlling said drilling based at least in part on said monitoring.

13. The method of claim 12 wherein controlling said drilling further comprises maintaining said BHA at a desired distance from an interface in said earth formation.

14. The method of claim 13 further comprising selecting said associated values and said number of terms of said MFF based at least in part on said desired distance.

15. The method of claim 1 further comprising using a plurality of bucking coils to substantially compensate for a direct field, at one of said frequencies, between said at least one transmitter and said at least one receiver.

16. An apparatus for determining a resistivity of an earth formation comprising:

(a) a resistivity measuring instrument conveyed in a borehole in said earth formation, said resistivity measuring instrument having:

(A) a mandrel (housing), (B) at least one transmitter on said mandrel which operates at a number m of frequencies having selected associated values ($\omega_i$, i=1,m) and produces electromagnetic fields in said earth formation, and (C) at least one receiver spaced apart from said at least one transmitter which produce signals resulting from interaction of said electromagnetic fields with said earth formation; and (b) a processor which applies a multifrequency focusing (MFF) to said produced signals to give a focused signal;

wherein said associated values are selected to increase linear independence of vectors defined by said associated values and a number of terms n of said MFF.

17. The apparatus of claim 16 wherein said mandrel comprises a portion having a finite non-zero conductivity and wherein said MFF accounts for said finite non-zero conductivity.

18. The apparatus of claim 16 wherein said vectors are defined as $$\vec{\omega}^{1/2}, \vec{\omega}^{1}, \vec{\omega}^{3/2}, \ldots \vec{\omega}^{n/2}, \text{ with}$$

$\vec{\omega}=[\omega_1, \omega_2, \ldots \omega_m]^T$, where $[.]^T$ denotes a transpose.

19. The apparatus of claim 17 wherein said vectors are defined as $$\vec{\omega}^{1}, \vec{\omega}^{3/2}, \ldots \vec{\omega}^{n/2}, \text{ with}$$

$\vec{\omega}=[\omega_1, \omega_2, \ldots \omega_m]^T$, where $[.]^T$ denotes a transpose.

20. The apparatus of claim 16 wherein said associated values are selected based at least in part on a singular value decomposition (SVD) of a matrix determined from said vectors.

21. The apparatus of claim 16 wherein said associated values and said number of terms of said MFF are selected based at least in part on an error amplification of said MFF.

22. The apparatus of claim 16 wherein said associated values and said number of terms of said MFF are selected based at least in part on an MFF voltage related to said MFF.

23. The apparatus of claim 16 wherein said associated values and said number of terms of said MFF are selected based at least in part on an MFF focusing factor.

24. The apparatus of claim 16 wherein said processor is at a downhole location.

25. The apparatus of claim 16 wherein processor further determines a formation resistivity from said focused signal.

26. The apparatus of claim 17 further comprising a bottomhole assembly (BHA) carrying said resistivity measuring instrument into said borehole, said BHA having a device for extending said borehole, and wherein said processor further determines a distance to an interface based at least in part on said determined resistivity.

27. The apparatus of claim 26 further comprising a processor for controlling a direction of drilling of said BHA based at least in part on said determined distance.

28. The apparatus of claim 26 wherein said processor controls a direction of drilling of said BHA based at least in part on said determined distance.

29. The apparatus of claim 17 further comprising a bottomhole assembly (BHA) which:

(i) conveys said resistivity measuring instrument into said borehole, and (ii) has a device for extending said borehole;

wherein said processor monitors a change in said focused signal during continued drilling of said wellbore.

30. The apparatus of claim 29 further comprising a processor which controls said drilling based at least in part on said monitoring.

31. The apparatus of claim 29 wherein said processor controls said drilling based at least in part on said monitoring.

32. The apparatus of claim 30 wherein said a processor maintains said BHA at a desired distance from an interface in said earth formation.

33. The apparatus of claim 32 wherein said associated values and said number of terms of said MFF are selected based at least in part on said desired distance.

34. The apparatus of claim 16 further comprising a plurality of bucking coils which substantially compensate for a direct field, at one of said frequencies, between said at least one transmitter and said at least one receiver.

35. The apparatus of claim 16 wherein said at least one transmitter comprises a plurality of transmitters.

36. The apparatus of claim 16 wherein said at least one receiver comprises a plurality of receivers.

37. A method of estimating a resistivity of an earth formation comprising:

(a) conveying a resistivity measuring tool conveyed into a borehole in the earth formation, the resistivity measuring tool having a mandrel (housing) with a finite, non-zero conductivity:

(b) operating a transmitter on said resistivity measuring tool at a plurality of frequencies;

(c) receiving signals at least one receiver on said resistivity measuring tool, said at least one receiver axially separated from said transmitter, said signals indicative of said resistivity of said earth formation; and (d) processing said received signals and estimating the resistivity of the earth formation, said processing taking into said account finite, non-zero conductivity of said mandrel.

38. The method of claim 37, wherein processing said receive signals further comprises depicting said received signals using a Taylor expansion of frequency including a term $\omega^{1/2}$ where $\omega$ is an angular frequency.

39. The method of claim 37, the results of said processing are substantially independent of a separation between said at least one receiver and said transmitter.

40. The method of claim 37, wherein said processing further comprises:

(i) determining a magnitude of said signals at each one of said plurality of frequencies;

(ii) determining a relationship of said magnitudes with respect to frequency; and (iii) calculating a skin effect corrected conductivity by calculating a value of said relationship which would obtain when said frequency is equal to zero.

41. An apparatus for estimating a resistivity of an earth formation, said apparatus comprising:

a) a mandrel (housing) on a measurement—while-drilling (MWD) tool, said mandrel having a finite non-zero conductivity having a finite, non-zero conductivity;

b) a transmitter and at least one receiver spaced apart from said transmitter on said MWD tool, said transmitter operating at a plurality of frequencies and said at least one receiver receiving signals indicative of said resistivity; and c) a processor which processes said received signals and estimates said resistivity, said determination accounting for said finite non-zero conductivity.

42. The apparatus of claim 41, wherein said determination is independent of a spacing of said at least one receiver from said transmitter.

43. The apparatus of claim 41, wherein said processor performs a Taylor Series expansion in terms of frequency of said received signals, said expansion including a term in $\omega^{1/2}$, where $\omega$ is an angular frequency.

* * * * *